United States Patent [19]
Huang et al.

[11] Patent Number: 6,005,211
[45] Date of Patent: Dec. 21, 1999

[54] METHOD AND APPARATUS FOR SORTING ARTICLES USING A MATRIX OF CONVEYOR CELLS

[75] Inventors: Pao-Ter Huang, Alpharetta, Ga.; Chunsheng Cai, New Fairfield, Conn.; Jaroslay Janik; John Lecko, both of Southbury, Conn.

[73] Assignee: United Parcel Service of America, Inc., Atlanta, Ga.

[21] Appl. No.: 08/595,672

[22] Filed: Feb. 2, 1996

[51] Int. Cl.⁶ ...................................................... B07C 5/00
[52] U.S. Cl. .......................... 209/583; 209/579; 209/939; 198/370.06
[58] Field of Search ...................................... 209/583, 584, 209/695, 922, 923, 579, 587, 939; 198/370.03, 370.06, 370.09, 809

[56] References Cited

U.S. PATENT DOCUMENTS

| | | |
|---|---|---|
| Re. 25,673 | 11/1964 | Burt . |
| 2,993,583 | 6/1961 | Sykes . |
| 3,026,988 | 6/1962 | Fisk . |
| 3,219,166 | 11/1965 | Collins et al. . |
| 3,291,279 | 12/1966 | God et al. . |
| 3,292,804 | 12/1966 | Veneman . |
| 3,303,923 | 2/1967 | Davis et al. . |
| 3,334,723 | 8/1967 | Reed et al. . |
| 3,552,541 | 1/1971 | Riggs . |
| 3,567,002 | 3/1971 | Russ ................................... 198/370.09 |
| 3,580,141 | 5/1971 | Richter . |
| 3,608,713 | 9/1971 | Crosby et al. . |
| 3,639,728 | 2/1972 | Helfand . |
| 3,642,117 | 2/1972 | Burt . |
| 3,710,917 | 1/1973 | Black et al. ........................ 198/370.09 |
| 3,734,264 | 5/1973 | Stumpf . |
| 3,743,090 | 7/1973 | Brown . |
| 3,926,298 | 12/1975 | Miller et al. . |
| 4,129,229 | 12/1978 | Brown . |
| 4,174,774 | 11/1979 | Bourgeois . |
| 4,284,187 | 8/1981 | Kramer . |
| 4,541,824 | 9/1985 | Müller . |
| 4,633,996 | 1/1987 | Waterhouse . |
| 4,690,283 | 9/1987 | Carrell . |
| 4,712,965 | 12/1987 | Canziani . |
| 4,730,718 | 3/1988 | Fazio et al. . |

(List continued on next page.)

FOREIGN PATENT DOCUMENTS

| | | |
|---|---|---|
| 0 477 104 | 3/1992 | European Pat. Off. . |
| 517110-A1 | 12/1992 | European Pat. Off. . |
| 0 613 730 | 9/1994 | European Pat. Off. . |
| 0 654 425 | 5/1995 | European Pat. Off. . |
| 2676941 | 12/1992 | France ................................... 209/584 |
| 24 24 507 | 11/1975 | Germany . |
| 38 31 210 | 3/1990 | Germany . |
| 64-22758 | 1/1989 | Japan . |
| 5-178452 | 7/1993 | Japan . |
| 487 785 | 3/1970 | Switzerland . |

OTHER PUBLICATIONS

Ermanco, Incorporated, *Urethane Belt Transfer (UBT), EH40–1195; EH400894*.

*Primary Examiner*—Boris Milef
*Attorney, Agent, or Firm*—Jones & Askew, LLP

[57] ABSTRACT

An efficient package sorting system in which a stationary matrix of multi-directional conveyor cells sorts packages to a plurality of destination locations. In a preferred embodiment, the matrix delivers sorted packages to a plurality of lift assemblies that further transfer the packages to receiving conveyors or chutes on different levels. According to another preferred aspect of the system, a selectively elevating stop bar is provided to control side transfer between conveyor cells. A controller is operative to plan a path for each of the objects from the input cell to a destination location, to monitor availability of successive conveyor cells along the path, and to cause an object to be moved to the next conveyor cell along its path only when the next conveyor cell is available. The system may include a plurality of sensors positioned to sense the passage of objects from one conveyor cell to another, the sensors being connected to the controller. The sensor input is used to guide the packages through the matrix, and to optimize the speed at which a plurality of packages can be sorted.

16 Claims, 19 Drawing Sheets

U.S. PATENT DOCUMENTS

| | | |
|---|---|---|
| 4,732,260 | 3/1988 | Canziani . |
| 4,798,275 | 1/1989 | Leemkuil . |
| 4,832,203 | 5/1989 | Nozawa . |
| 4,832,204 | 5/1989 | Handy . |
| 4,836,386 | 6/1989 | Smith . |
| 4,838,137 | 6/1989 | Azuma . |
| 4,911,281 | 3/1990 | Jenkner . |
| 4,962,841 | 10/1990 | Kloosterhouse . |
| 5,054,601 | 10/1991 | Sjogren . |
| 5,165,516 | 11/1992 | Reed et al. . |
| 5,181,820 | 1/1993 | Sjogren . |
| 5,284,252 | 2/1994 | Bonnet . |
| 5,297,924 | 3/1994 | Neri et al. ............................ 209/583 X |
| 5,433,311 | 7/1995 | Bonnet . |
| 5,505,291 | 4/1996 | Huang . |
| 5,547,084 | 8/1996 | Okada et al. ............................ 209/583 |
| 5,551,543 | 9/1996 | Mattingly et al. . |
| 5,620,102 | 4/1997 | Finch, Jr. ................................ 209/583 |

Fig_3

Fig_9

Fig_12

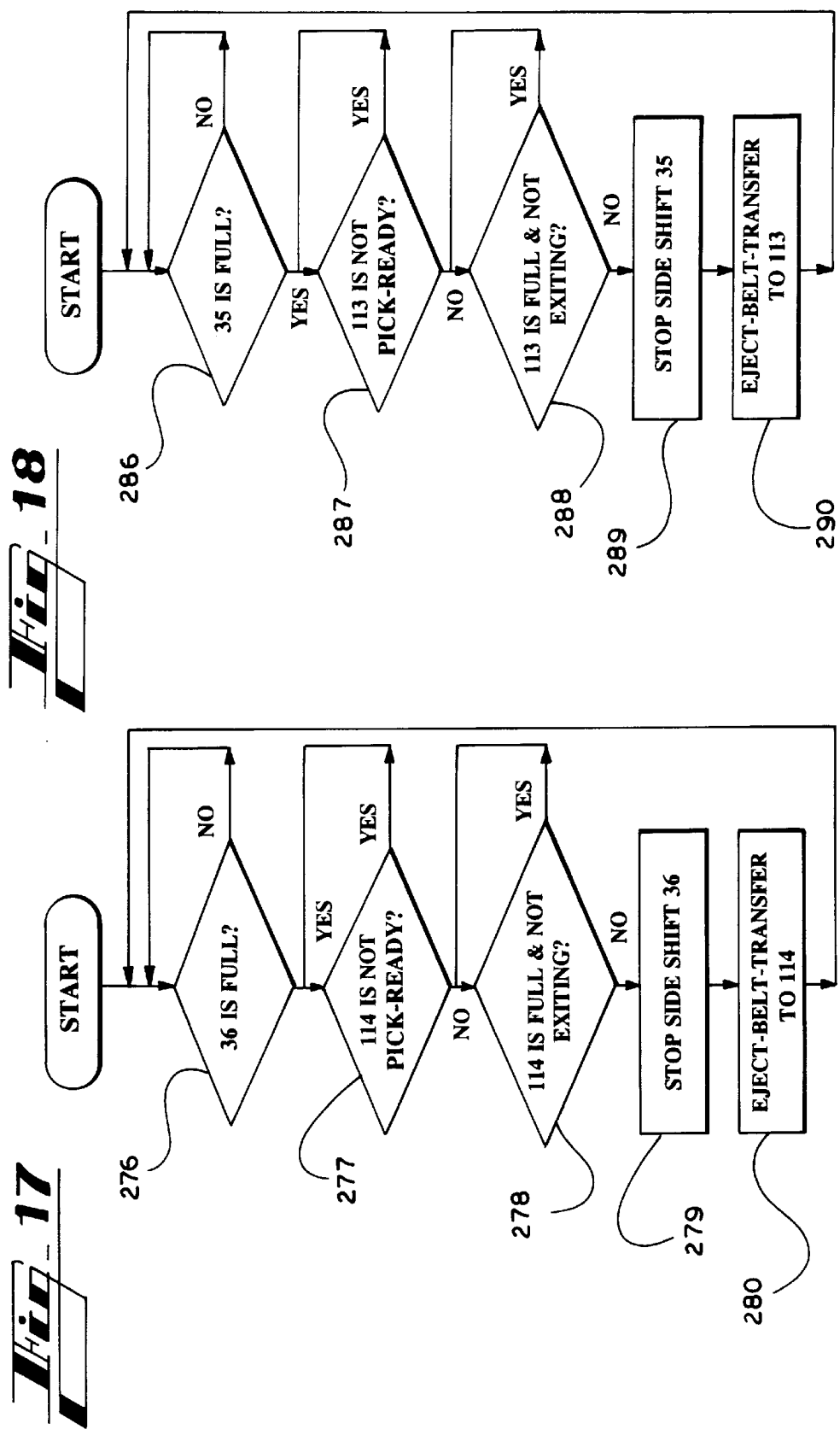

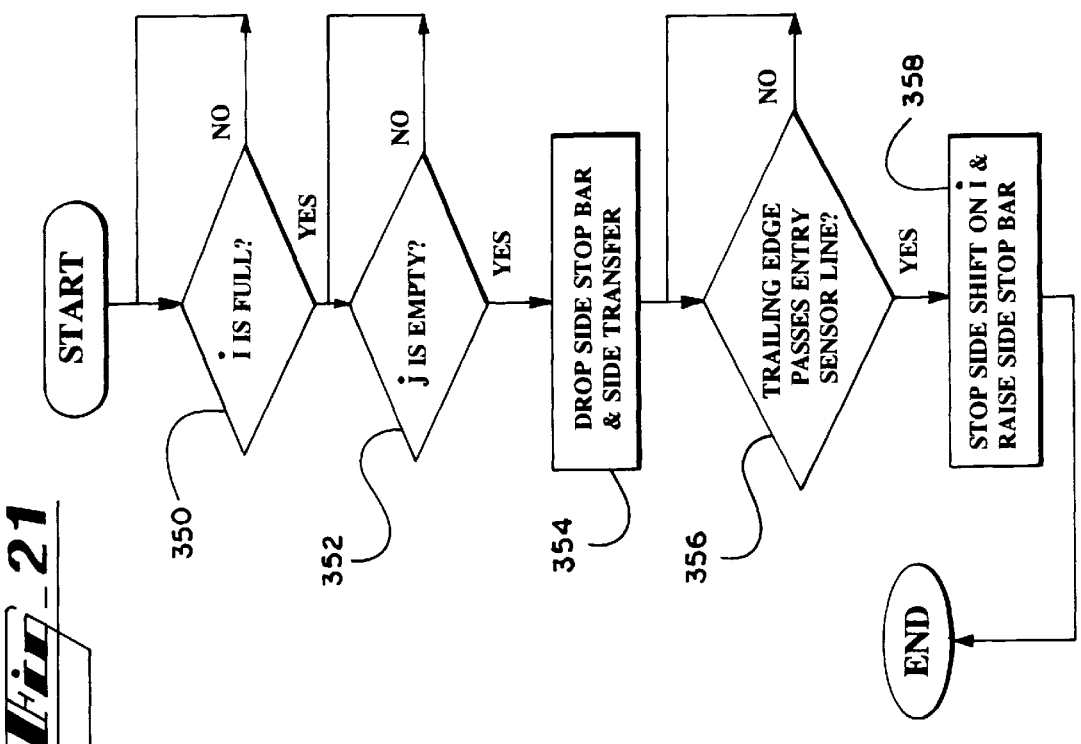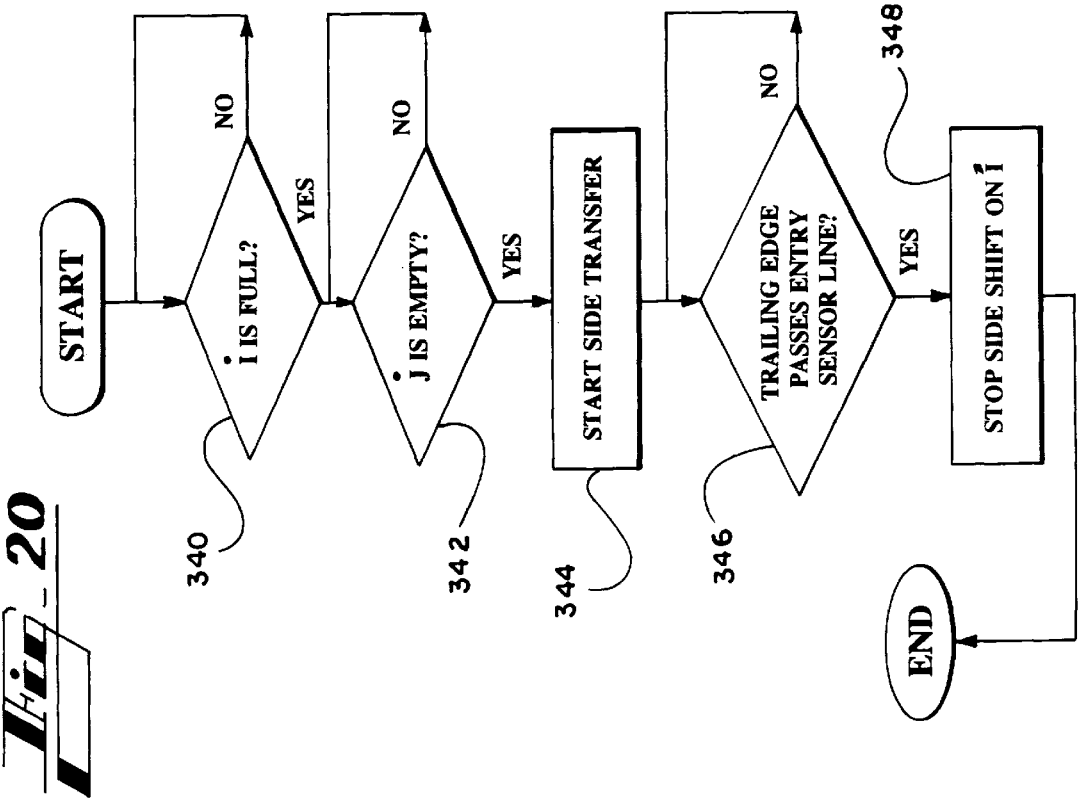

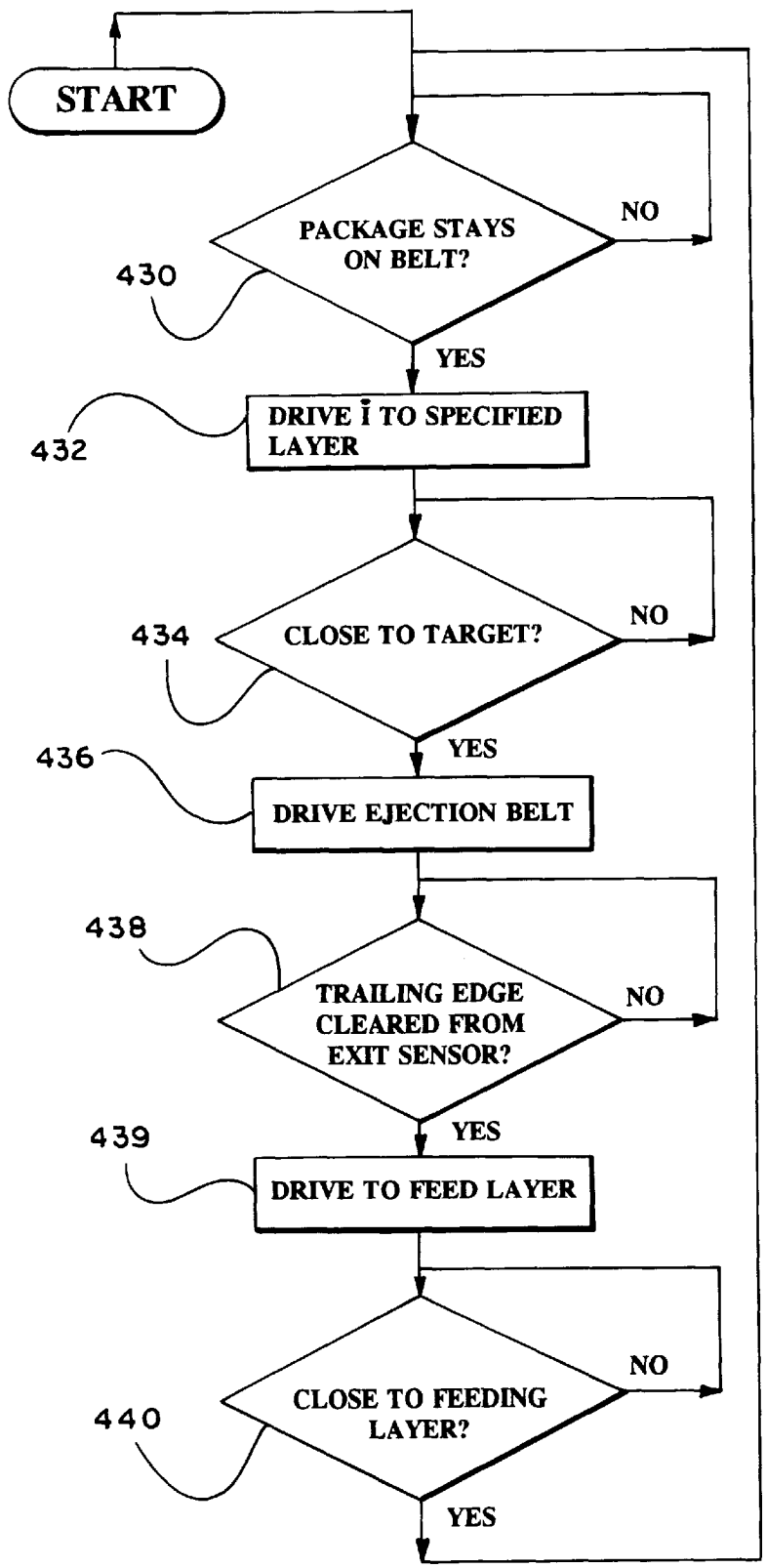
Fig_23

METHOD AND APPARATUS FOR SORTING ARTICLES USING A MATRIX OF CONVEYOR CELLS

RELATED APPLICATIONS

The disclosures of the following related applications are hereby incorporated by reference: U.S. application Ser. No. 08/421,675, filed Apr. 12, 1995, entitled "Method and Apparatus for Lifting Packages," and U.S. application Ser. No. 08/595,665, filed Feb. 2, 1996, entitled "Conveyor Control System," now U.S. Pat. No. 5,711,410. Both such applications are commonly owned by the assignee of the present invention.

TECHNICAL FIELD

The present invention relates to material handling systems utilizing conveyors, and more particularly relates to a package or parcel transfer and sorting system useful in a hub facility of a package delivery system.

BACKGROUND ART

In a large package delivery system, millions of packages picked up from thousands of locations over a large geographical area must be transported, primarily by truck and airplane, to a correspondingly large number of destinations that are also scattered over a large area. Such delivery services are offered within guaranteed times as short as one day. To meet a rigorous schedule and provide accurate deliveries, a package delivery company must use automated transfer systems to match incoming packages with proper transport that is heading to their destinations.

Belt and roller conveyor systems have often been used in package sorting systems to move packages from incoming loading docks to outgoing transport. Typically, conveyors carry packages unloaded from a truck to a worker who manually sorts them by reading address information on shipping labels attached to the packages. The worker then places the packages onto receiving conveyors or chutes which carry the packages either to a loading dock for loading onto outgoing trucks, or to another sorting station for a narrower breakdown of destinations. A distribution hub in a package delivery system may have as many as 20 to 60 sorting stations operating simultaneously. By providing vertically stacked rows of receiving conveyors, the sorting operation could be accommodated in a relatively small amount of floor space.

To automate handling of articles in conveyor systems, conveyor diverter assemblies have been developed. Examples of conveyor diverters are shown in U.S. Pat. Nos. 4,798,275 to Leemkuil et. al., and 4,174,774 to Bourgeois, both of which are incorporated herein by reference. However, such diverters are used primarily to divert articles from a main linear conveyor. Thus, such systems occupy a relatively large amount of space. This problem is overcome by the rotary sorter system shown in U.S. Pat. No. 5,284,252 to Bonnet, assigned to the assignee of the present application. In this system, destination codes on shipping label of packages are machine read, and the packages are transferred onto powered conveyor modules mounted on a rotating distribution assembly. The individual module is then rotated and elevated or lowered into alignment with one of a plurality of destination conveyors that are spaced apart both horizontally and vertically. After such alignment, the modules rollers are operated to discharge the package onto the destination conveyor. In the Bonnet system, packages can be rapidly sorted without human intervention by an apparatus that occupies a small amount of floor space.

For some circumstances, it would be advantageous to have a compact package sorting system that did not require moving a conveyor module holding a package from a loading point to a discharge point.

SUMMARY OF THE INVENTION

The present invention provides an efficient package sorting system in which a stationary matrix of multi-directional conveyor cells sorts packages to a plurality of destination locations. In a preferred embodiment, the matrix delivers sorted packages to a plurality of lift assemblies that further transfer the packages to receiving conveyors or chutes on different levels. According to another preferred aspect of the system, a selectively elevating stop bar is provided to control side transfer between conveyor cells.

Generally described, according to one of its aspects, the present invention provides a system for sorting a stream of objects emanating one-by-one from an object source, comprising: a matrix of stationary conveyor cells, including a plurality of the cells positioned to form at least two transversely extending rows of adjacent conveyor cells and at least two longitudinally extending rows of adjacent conveyor cells, an input cell of the conveyor cells in a first transversely extending row being positioned to receive objects from the object source; a controller connected to operate a plurality of the conveyor cells in the matrix individually to discharge an object thereon in one of a plurality of directions; a plurality of destination locations positioned adjacent to the conveyor cells in at least one of the transverse rows other than the first transverse row; a reader positioned adjacent to the stream of objects to read destination information borne by the objects; the controller being operative responsive to the reader to guide each object received by the input cell from cell to cell through the matrix to a destination location corresponding to the destination information.

In a preferred embodiment, the controller is operative to plan a path for each of the objects from the input cell to a destination location, to monitor availability of successive conveyor cells along the path, and to cause an object to be moved to the next conveyor cell along its path only when the next conveyor cell is available. The system may include a plurality of sensors positioned to sense the passage of objects from one conveyor cell to another, the sensors being connected to the controller. The sensor input is used to guide the packages through the matrix, and to optimize the speed at which a plurality of packages can be sorted.

According to another aspect, the present invention provides a method of sorting objects emanating one-by-one from an object source, comprising the steps of: transferring each of the objects from the object source to a matrix of stationary conveyor cells, the matrix including a plurality of the cells positioned to form at least two transversely extending rows of adjacent conveyor cells and at least two longitudinally extending rows of adjacent conveyor cells, and transferring each of the objects through the matrix from one of the conveyor cells to another and to one of a plurality of destination locations. In a preferred embodiment, the method may further comprise the steps of: reading destination information from each of the objects as the objects enter the matrix; and guiding the objects to one of the destination locations corresponding to the destination information. The method may also comprise monitoring availability of a next conveyor cell in the matrix to which an object is to be moved; and moving the object to the next cell only when the cell is available.

According to yet another aspect, the present invention provides, in a conveyor unit including a plurality of spaced apart rollers extending to a unit edge extending perpendicular to a longitudinal axis of the rollers, a side stop plate assembly, comprising: an elongate stop plate extending parallel to the unit edge and spaced inwardly from the unit edge above the rollers, and defining a pair of arms extending downwardly from the stop plate between the rollers to be pivotally attached to a support member of the conveyor unit; the stop plate being pivotal from an elevated position above the rollers to a horizontal position along the unit edge; means for moving the stop plate between the elevated position and the horizontal position. Preferably, the means for moving the stop plate comprises a foldable linkage attached to a linear actuator, and wherein the linkage locks against pressure on the stop plate when the stop plate is in the elevated position.

Thus, it is an object of the present invention to provide an improved package sorting system and method.

It is another object of the present invention to provide a package sorting system and method in which sorting on one level does not require movement of a conveyor unit from one place to another.

It is another object of the present invention to provide a package sorting system and method with improved processing speed.

It is another object of the present invention to provide a package sorting system and method applicable to output packages to rows of vertically spaced receiving conveyors or chutes.

Other objects, features and advantages of the present invention will become apparent upon review of the following detailed description of a preferred embodiment and the attached drawings.

BRIEF DESCRIPTION OF THE DRAWINGS

FIG. 17 is a flow diagram of the logic applied in transferring a package from the cell to the left of the cell of FIG. 16.

FIG. 18 is a flow diagram of the logic applied in transferring a package from the cell to the right of the cell of FIG. 15.

FIG. 20 is a flow diagram of the logic applied in side transfer of a package without a separating stop bar.

FIG. 21 is a flow diagram of the logic applied in side transfer of a package with side stop bar operation.

FIG. 23 is a flow diagram of the logic applied in shifting the level of a lift conveyor.

DETAILED DESCRIPTION

Figure 1:
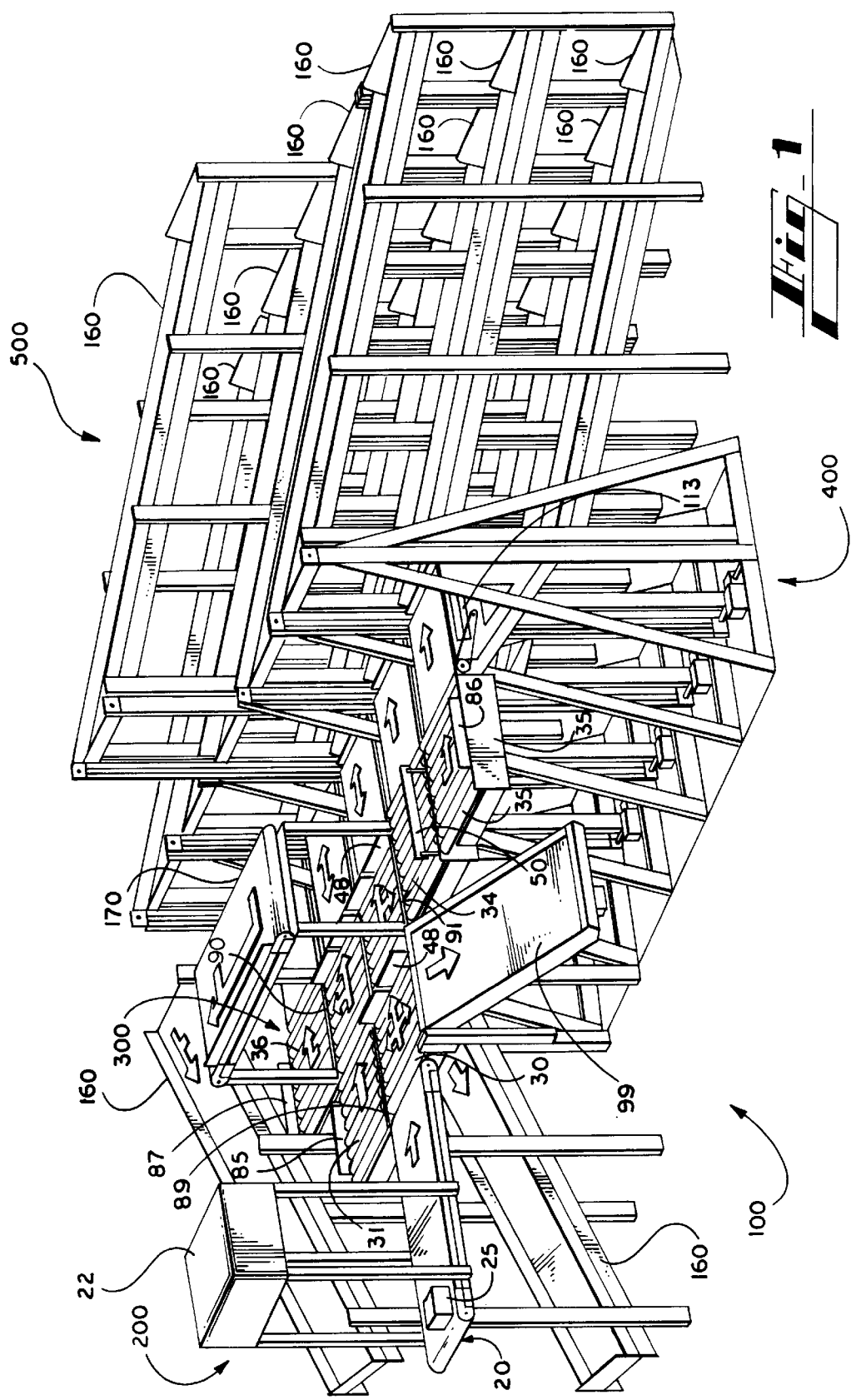
FIG. 1 is a pictorial view of a package sorting system embodying the present invention.

Referring now in more detail to the drawings, in which like numerals refer to like parts throughout the several views, FIG. 1 shows a package sorting system 100 embodying the present invention. The sorting system 100 is composed of a feed assembly 200, which feeds packages to a matrix sorting assembly 300. From the sorting assembly 300, the packages are transferred to a vertical lift and discharge assembly 400, from which they are discharged into an chute array 500 of destination-specific output chutes. These assemblies will be described in detail below. The vertical lift assembly 400 contains destination locations from the matrix sorting assembly 300, and the chute array 500 contains ultimate package destinations in the sorting system 100.

The sorting and transfer process is controlled by a digital controller 180, the function of which is described below with reference to FIGS. 11–23. The controller may be a programmed general purpose personal computer. The controller receives input from detectors and sensors associated with various conveyors and chutes, all described below, and provides control signals instructing conveyors to operate to transfer packages in a selected direction.

Figure 2:
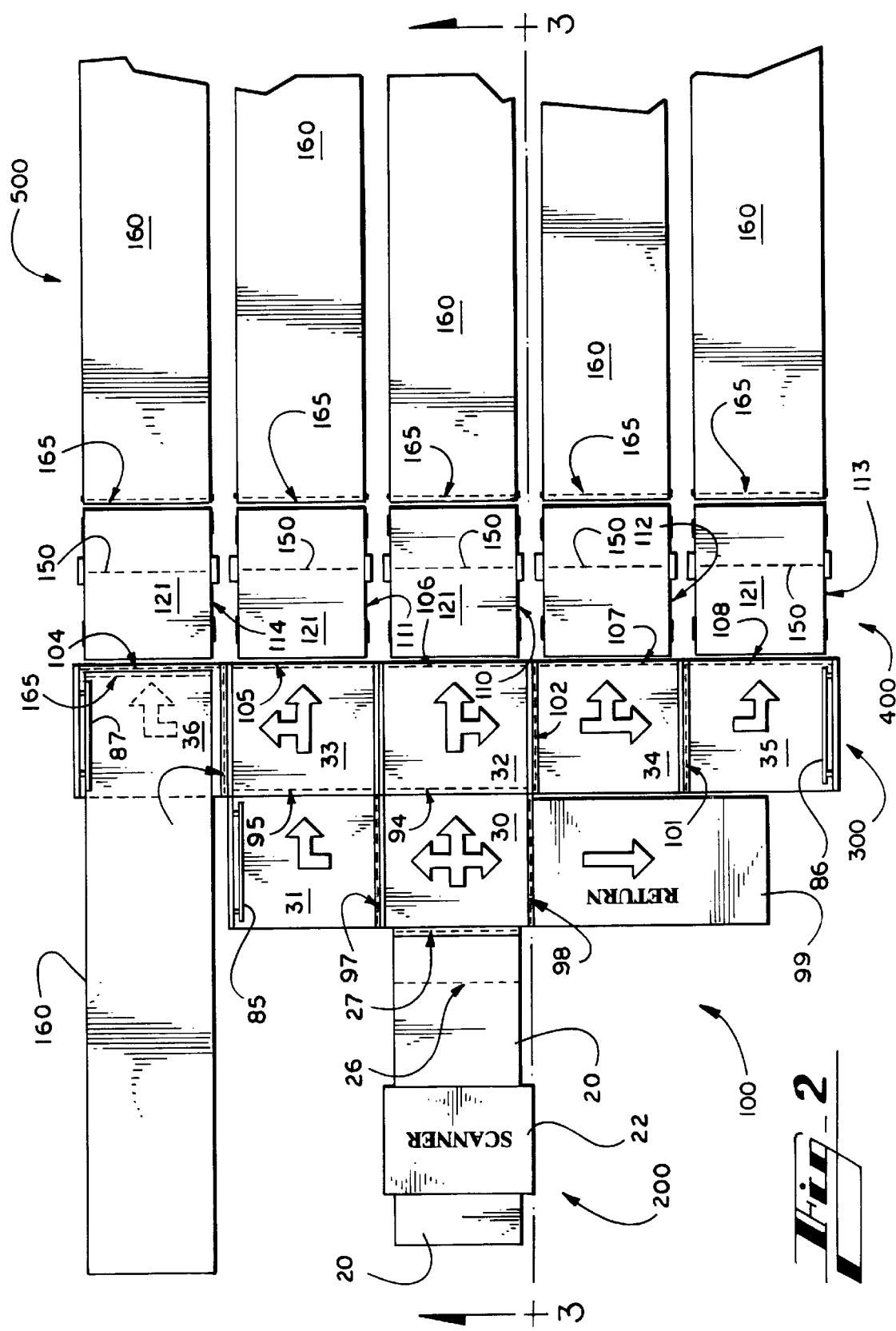
FIG. 2 is a diagrammatic top view of the main level of the sorting system of FIG. 1.

The feed assembly 200 includes a feed conveyor 20 which is a horizontally mounted belt conveyor. An optical scanner 22 is mounted above the feed conveyor 20, so as to be able to scan a package 25 moving under the scanner 22 on the conveyor 20. The packages 25 bear labels on which are printed optically encoded symbols such as bar codes or two-dimensional dense codes, such as the MaxiCode symbology. The scanner may be either a conventional laser scanner or an over-the-belt video scanner having a charged coupled device (CCD) sensor. An example of the latter system is described in U.S. Pat. No. 5,308,960, which is incorporated herein by reference. A feed input sensor assembly 27 is located at the discharge end of the feed conveyor 20, as shown in FIG. 2. The sensor assembly 27 includes a conventional photocell transmitter and receiver. In the drawing, the light path between the transmitter and receiver is indicated by a dotted line, to which the reference numeral lead line is drawn. All package position sensors associated with the sorting system 100 are of this type and are shown in this manner. Spaced back from the discharge end of the feed conveyor a package deceleration sensor 26 is positioned. As explained below, if the next downstream location is occupied by another package, the drive motor (not shown) of the feed conveyor 20 is stopped when the leading edge of the package on the feed conveyor passes the deceleration sensor 26. This results in the package coming to a stop closely adjacent to the discharge end of the conveyor 20. A system for accomplishing this is described in Appendix B.

The matrix sorting assembly 300 includes an array or matrix of stationary multi-directional conveyor units 30–36, arranged in two closely adjacent rows of closely adjacent conveyor units. The conveyor units 30–36 are referred to herein as cells of the matrix, shown in FIGS. 1 and 2. An input cell 30 is positioned adjacent to the discharge end of the feed conveyor 20. Forming a first transverse row of cells with the cell 30 is a cell 31 positioned to the left side of the cell 30 when viewed from the feed conveyor. A second row of cells is formed by a cell 32, positioned longitudinally forward of the cell 30, a cell 33, positioned forward of the cell 31 and to the left of the cell 32, a cell 34, positioned to the right of the cell 32, a cell 35, positioned to the right of the cell 34, and a cell 36, positioned to the left of the cell 33.

Figure 3:
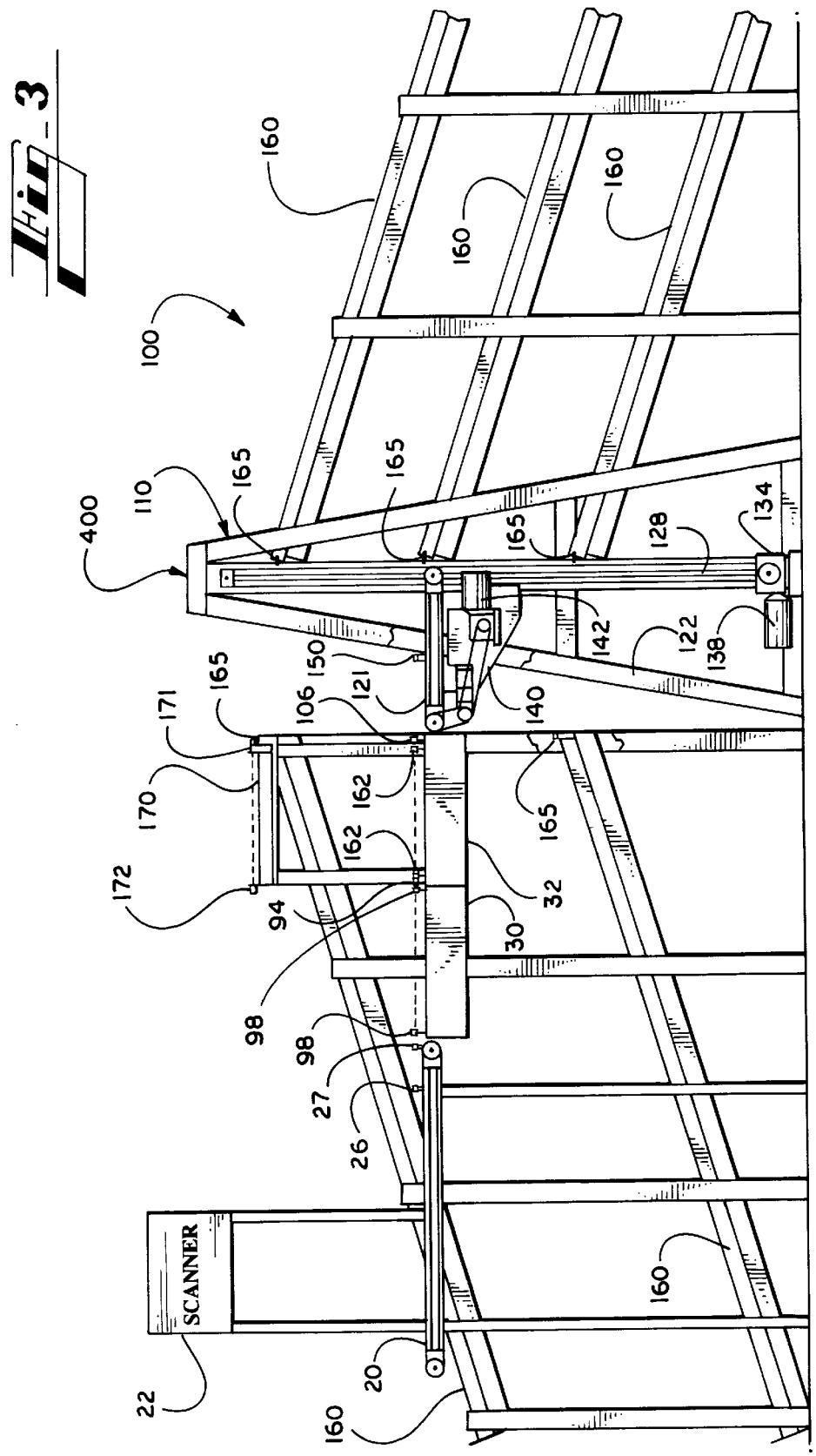
FIG. 3 is a side cross sectional view of the sorting system of FIG. 1, taken along line 3—3 of FIG. 2.

The feed assembly 200 and the matrix sorter 300 are supported at an elevated level as shown in FIG. 1, referred to herein as the feed level. The feed level is located midway up the array of output chutes 500, to minimize the distance to any particular output chute, as best shown in FIG. 3.

Figure 4:
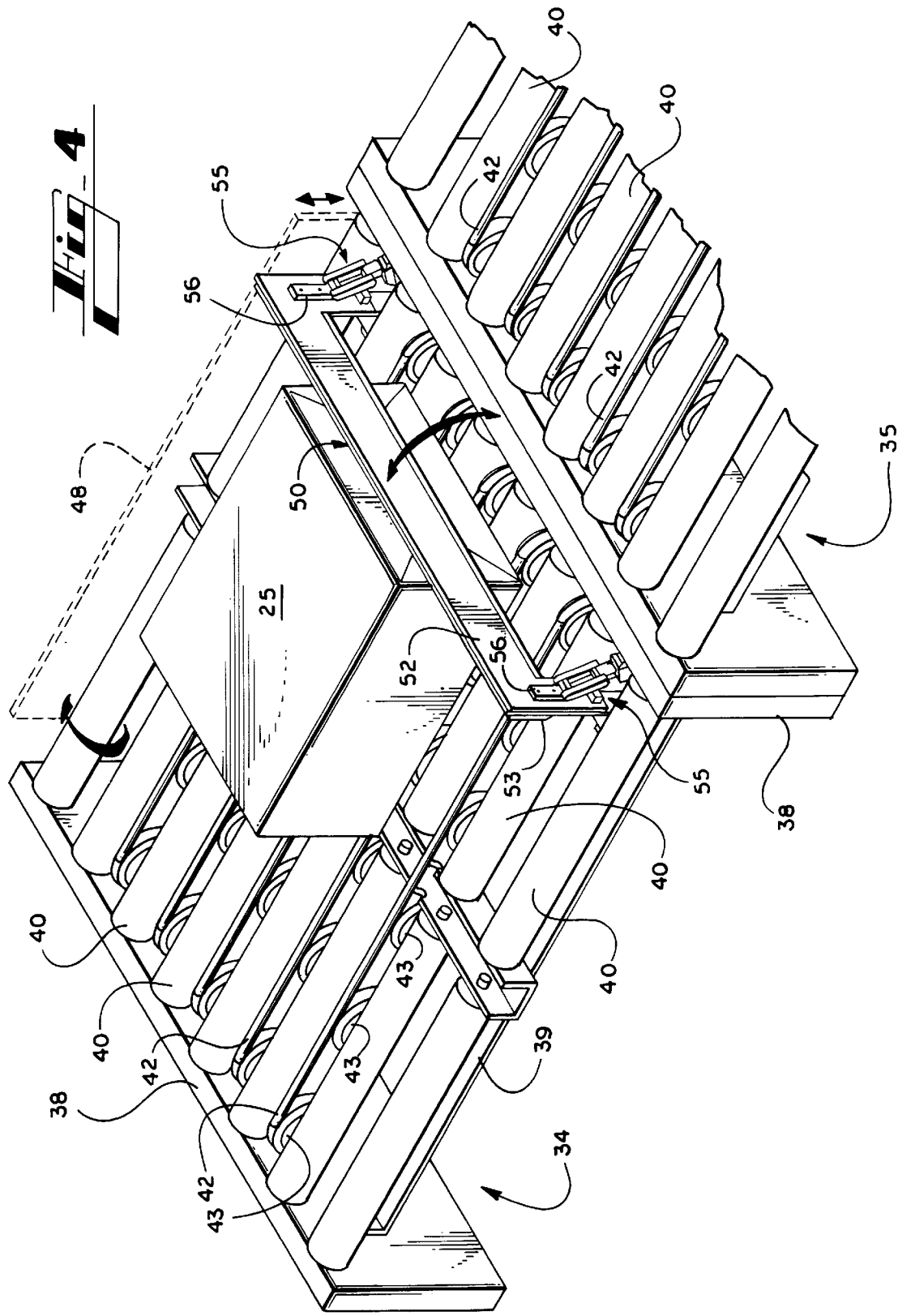
FIG. 4 is a pictorial view of a transfer conveyor with an elevated side transfer stop bar.

An example of a multi-directional conveyor unit is shown in FIG. 4. Each individual multi-directional conveyor unit 30–36 preferably is a ERMANCO model UBTXR40 line-shaft conveyor with right angle urethane belt transfer unit, modified to increase the size of pneumatic supply fittings, hoses and solenoid valve to one-half inch. The units include side frame members 38 connected by a cross member 39. A plurality of powered rollers 40 extend between the frame members. In several of the spaces between the rollers 40, urethane side transfer belts 42 are positioned on pulleys 43. The side transfer units 42,43 can be elevated up from between the rollers 40 to a level above the rollers, in a known manner, and operated to move the belts 42 in either direction perpendicular to the feed direction of the powered rollers 40. The units 30–36 are oriented so that the feed direction of the powered rollers is longitudinal, and the feed direction of the diverter belts 42 is transverse.

Alternate multi-directional diverter units that could be used as conveyor matrix cells are shown in U.S. Pat. Nos. 4,798,275 and 4,174,774, incorporated by reference above.

Conveyor units 30, 32, and 33 also are equipped with modified ERMANCO forward stop plates 48 that can be elevated as shown in FIGS. 1 and 4 to prevent discharge of a package by the powered rollers 40. The standard forward "pop-up" stop plates are modified to increase their vertical stroke to four inches to raise the elevated height of the stop plate to prevent the packages from tilting or jumping through the stop plate during a high speed impact stop. Also, the pneumatic pipe's diameter is increased to one-half inch.

The conveyor unit 34 includes a collapsible side transfer stop plate assembly 50, shown in FIGS. 4–8. The purpose of the assembly 50 is to selectively raise a stop plate 52 into a position inside the edges of the powered rollers 40, as shown in FIG. 4. In this position, the U-shaped plate 52 holds packages 25 against the action of the side transfer belts 42, so that when the side transfer belts 42 are lowered, the package will drop onto the powered rollers 40 for forward transfer without danger of the package running off the side edge of the next conveyor unit. The side transfer stop plate assembly 50 also is useful if the downstream conveyor is narrower than the conveyor unit on which the assembly is installed. It will be appreciated that such a side stop plate cannot simply be raised vertically like the forward stop bar 48, because of the presence of the rollers 40.

Figure 5:
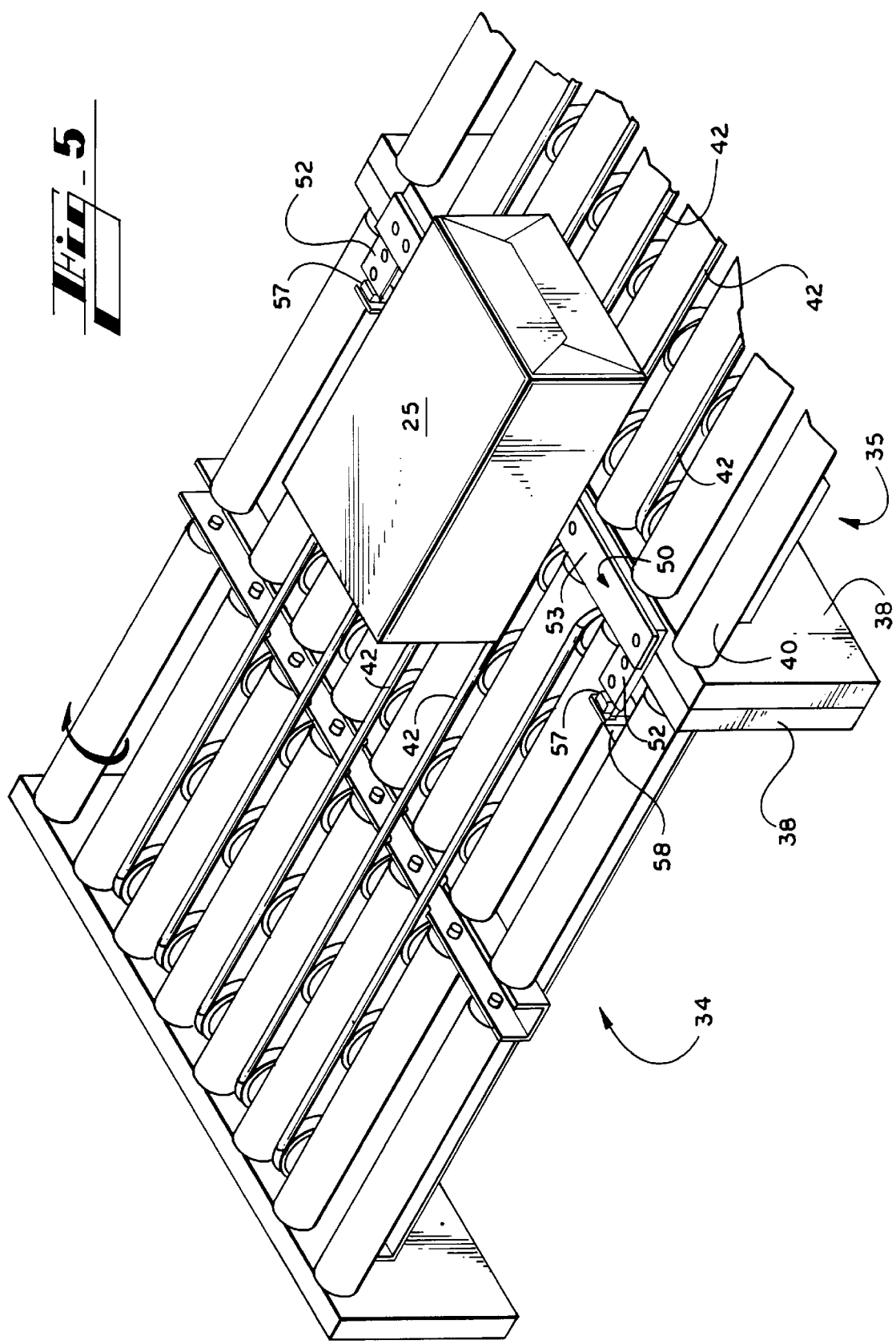
FIG. 5 is a pictorial view of a transfer conveyor with a lowered side transfer stop bar.
Figure 6:
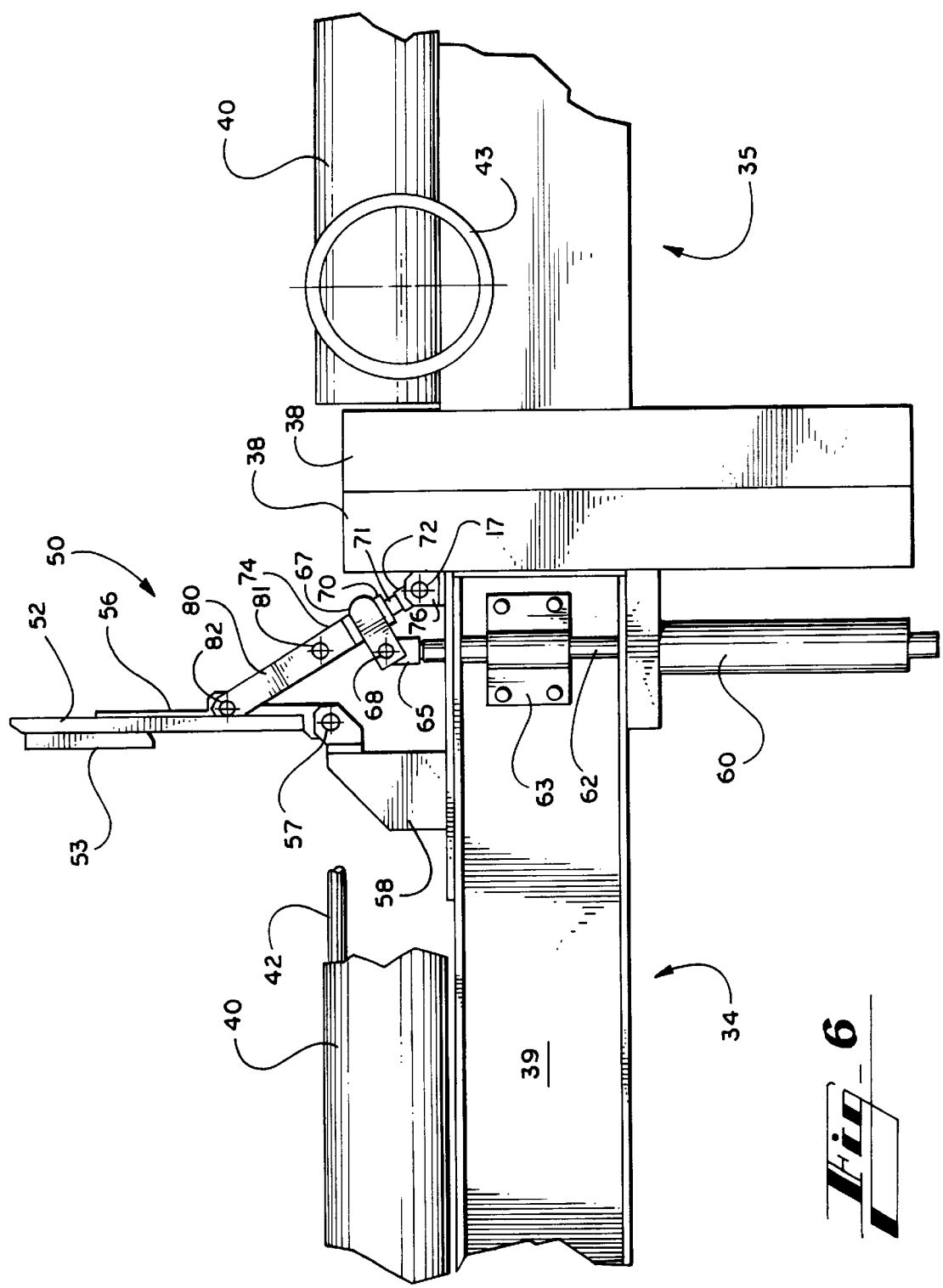
FIG. 6 is a side view of the elevated side transfer stop bar.
Figure 7:
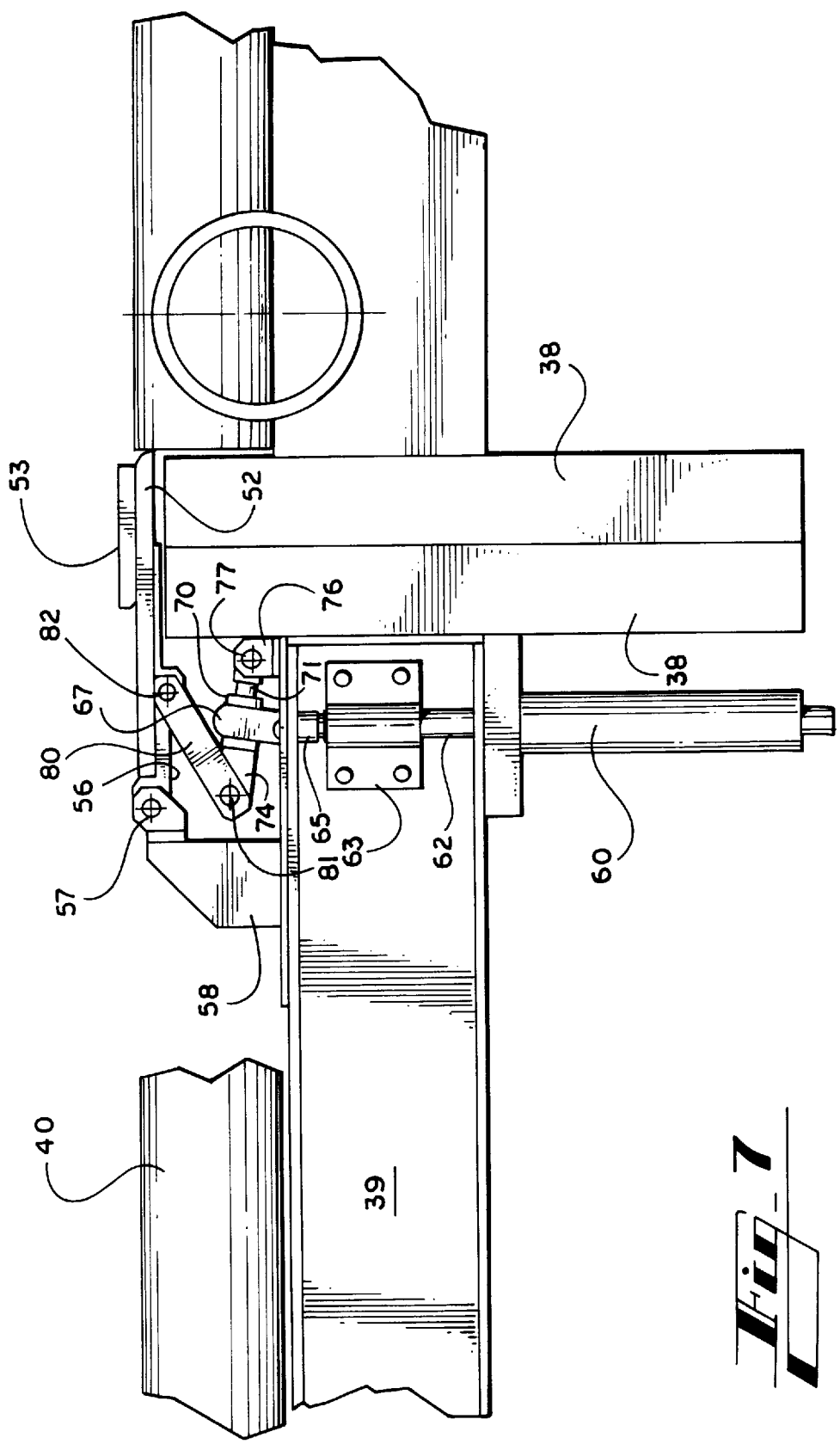
FIG. 7 is a side view of the lowered side transfer stop bar.
Figure 8:
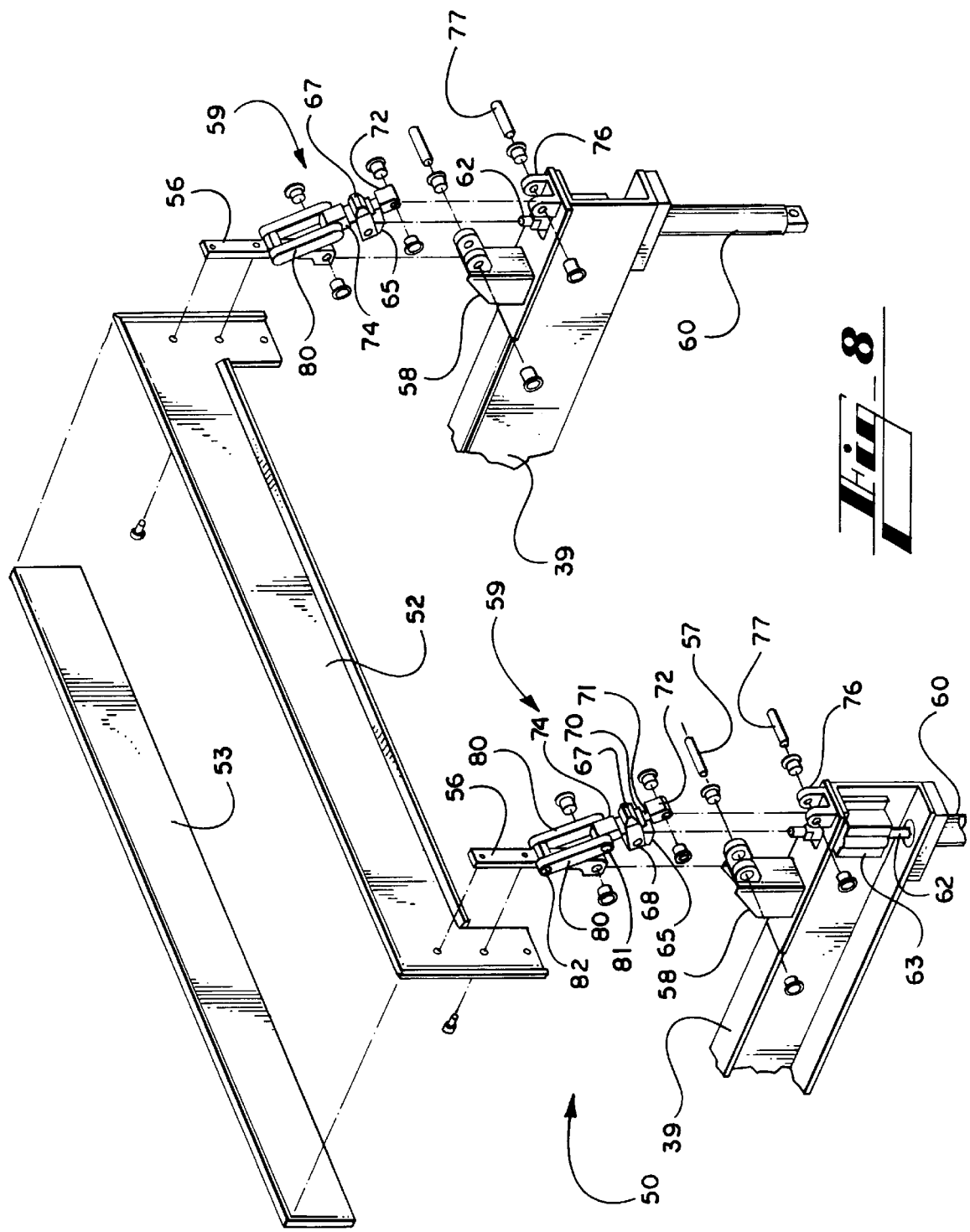
FIG. 8 is an exploded view of the side transfer stop bar assembly.

The side of the stop plate 52 facing the center of the conveyor unit 34 is lined with a sheet 53 of low friction plastic or Teflon. The arms of the "U-shaped" plate 52 extend between two of the rollers 40 near the ends of the unit 34. Each of the arms carries a plate support member 56 which terminates in a pivot joint 57 at the bottom of the arm of the plate 52. A pair of plate mounting blocks 58 are secured on the cross member 39 of the frame 38 of the conveyor unit 34, one block 58 below each support member 56. The blocks 58 provide a complementary portion of the pivot joints 57, and thereby support the stop plate 52. The stop plate 52 thus is able to pivot from an elevated position, shown in FIGS. 4 and 6, to a retracted position in which the plate lies flat across the frame members 38 of adjacent conveyor units 34 and 35, as shown in FIGS. 5 and 7. In the retracted position, the stop plate 52 bridges the gap between the rollers 40 of the adjacent conveyor cells, facilitating smooth side transfer of packages by the side transfer belts 42.

To move the stop plate 52 between its elevated and retracted positions, the stop plate assembly 50 includes two multi-link mechanisms 59, which are operated by a pair of air cylinders 60. The cylinders 60 are mounted beneath the cross member 39 and are actuated by a common solenoid valve (not shown) to assure simultaneous action. Actuation occurs when an appropriate control signal is received from the controller. Each cylinder 60 includes an adjustable length shaft 62 extending upwardly through a pillow block 63 and terminating in a shaft end 65. A linear bearing mount 67 is pivotally connected to the shaft end 65 by a pivot pin 68, and defines a central bore in which a linear bearing 70 is fitted. A link shaft 71 is slidably received within the bearing 70, and is pivotally connected at a lower shaft end 72 by a pivot pin 77 to a yoke 76. The yoke 76 is mounted on the cross member 39 on the opposite side of the cylinder shaft 62 from the plate mounting block 58.

An upper shaft end 74 of the link shaft 71 is pivotally connected, on the upper side of the bearing 70, to a lower end of each of a pair of link arms 80, by a pivot pin 81. The upper ends of the link arms 80 are pivotally connected by a pivot pin 82 to the plate support member 56 spaced upwardly from the pivot joint 57 along the arm of the stop plate 52. As noted, identical multi-link mechanisms 59 are installed at both ends of the stop plate 52.

It may be seen that each multi-link mechanism 59 includes five pivot joints 57, 68, 77, 81 and 82, and a slider shaft 71. Upon upward movement of the cylinder shaft 62, the link mechanism assumes the position shown in FIG. 6, with the link shaft 71 and link arms 80 aligned essentially colinearly. In this position, the link assembly 59 is "locked" such that the force induced by a package on the stop plate 52 will be directed along the link arms 80 and link shaft 71, and will not tend to collapse the link assembly. This configuration creates a rigid connection between the stop plate 52 and the frame 38, which is enforced and maintained by the fully extended cylinder shaft 62. When the cylinder shaft 62 is retraced, it folds the mechanism and pivots the stop plate into its horizontal position shown in FIGS. 5 and 7. It should be understood that this collapsible side transfer stop plate assembly can have other mechanical linkage arrangements, such as providing pivoting action without the slider shaft, or can have other types of actuators. Also, it can be utilized as an erectable barrier in systems other than a diverter conveyor unit of the type shown.

Transverse motion of packages in the matrix of conveyor cells is also controlled by fixed side stop bars 85, 86, and 87 attached along the outer sides of conveyor cells 31, 35, and 36, respectively, best shown in FIG. 2. Fixed transfer plates 89, 90, and 91 are positioned horizontally to bridge the gaps between rollers of conveyor cell pairs 30/31, 33/36, and 32/34, respectively, as shown in FIG. 1.

As shown in FIG. 2, many position sensor assemblies similar to the feed input sensor assembly 27 are utilized to enable the controller to track packages through the matrix sorter 300 and the lift and discharge assembly 400 to the output chutes 500. All of the sensor assemblies are capable of providing signals to the controller when the leading edge of a package breaks the photocell beam, and when the trailing edge leaves the beam. The manner in which these signals are used by the controller is discussed below in connection with logic flow diagrams. Two forward transfer sensor assemblies 94 and 95 are positioned at the entrance to conveyor cells 32 and 33, respectively, to monitor transfer of packages from the first row of cells to the second row. A side transfer sensor assembly 97 is positioned along the left side of the input cell 30 to monitor transfer of packages to the cell 31. A side transfer sensor assembly 98 is positioned along the right side of the input cell 30 to monitor transfer of packages to a return conveyor or chute 99 used primarily to remove from the sorter packages whose labels cannot be read. A side transfer sensor assembly 96 is positioned along the left side of the conveyor cell 33 to monitor transfer of packages to the cell 36. A side transfer sensor assembly 101 is positioned along the right side of the cell 34 to monitor transfer of packages to the cell 35. A side transfer sensor assembly 102 is positioned along the right side of the cell 32 to monitor transfer of packages to the cell 34. Forward transfer sensor assemblies 104, 105, 106, 107, and 108 are positioned along the forward or exit edge of the cells 36, 33, 32, 34, and 35, respectively, to monitor transfer of packages to the lift and discharge assembly 400.

Figure 9:
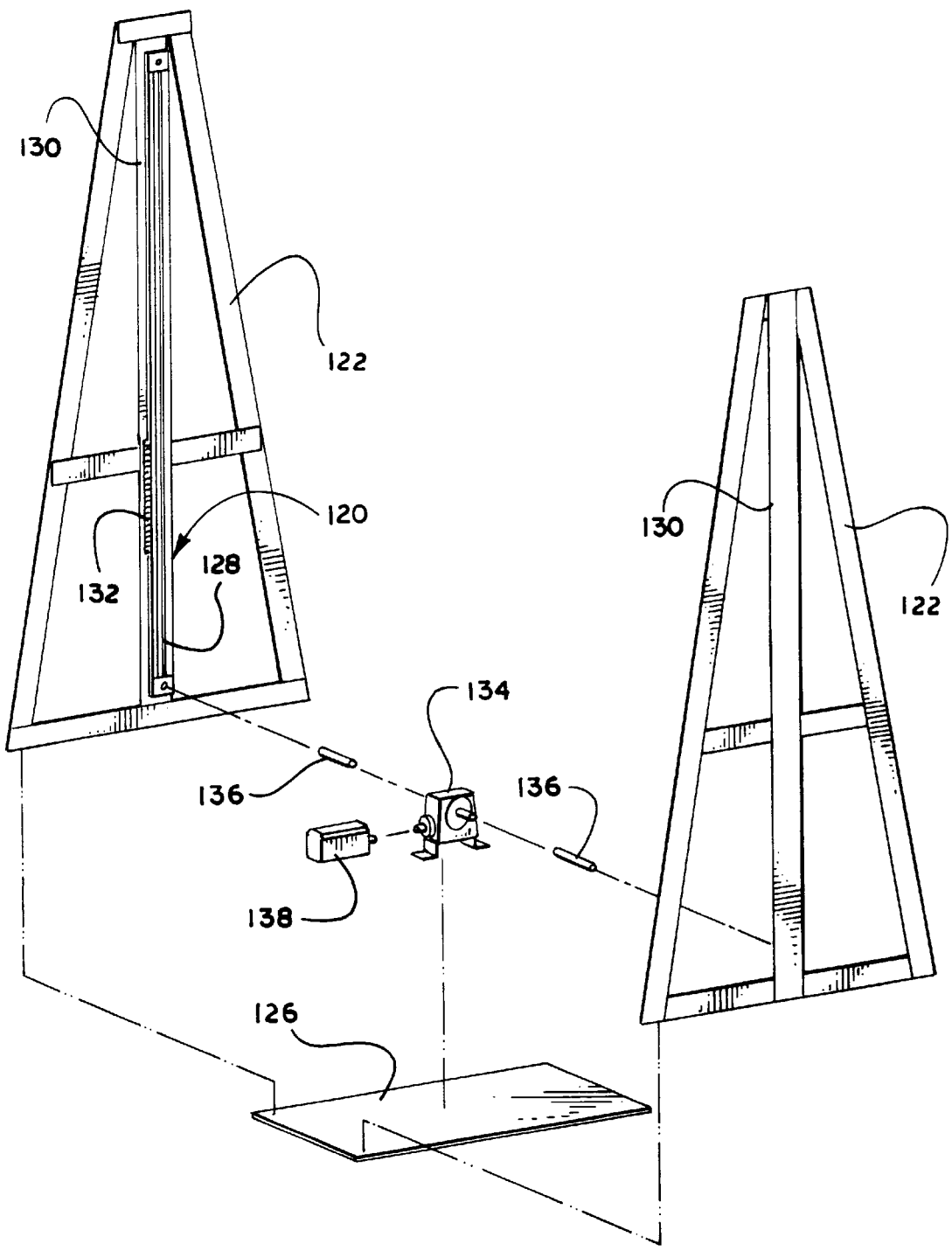
FIG. 9 is an exploded view of portions of a lift assembly.
Figure 10:
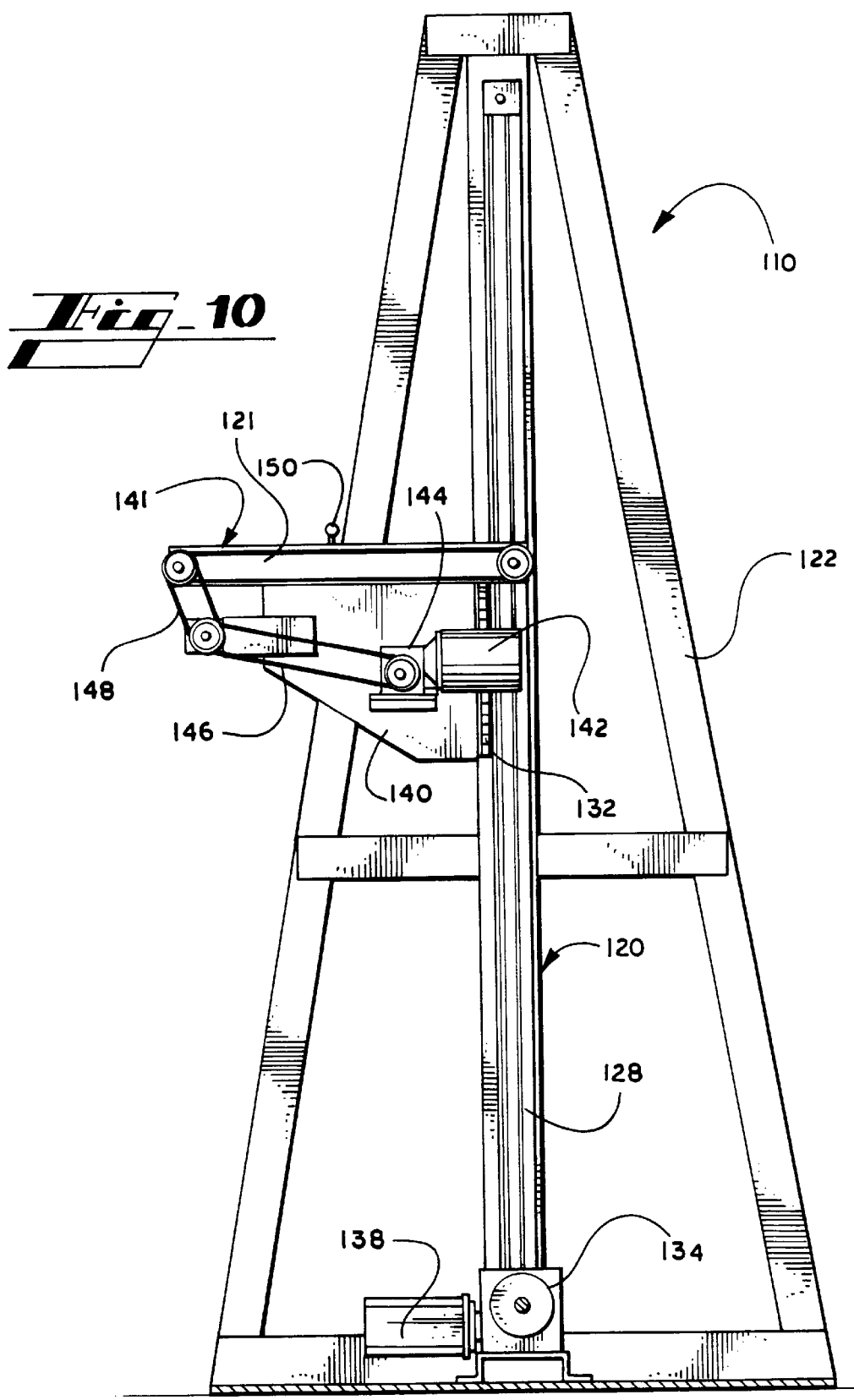
FIG. 10 is a side cross sectional view of a lift assembly.

The lift and discharge assembly 400 may be seen in FIGS. 1-3, 9 and 10. The assembly 400 includes five vertical lift units, 110-114, positioned to receive packages from the conveyor cells 36, 33, 32, 34, and 35, respectively, of the second row of the matrix sorter 300. The lift units are described in commonly owned U.S. application Ser. No. 08/421,675, filed Apr. 12, 1995, entitled "Method and Apparatus for Lifting Packages," which is incorporated herein by reference. As shown in FIG. 10 of the present application, each of the vertical lift units includes a reversible, height-adjustable, belt conveyor 121 which is configured to receive the parcels 25 when the conveyor 121 is at the feed level. The power conveyor 121 is mounted for movement up and down a support structure 120 and is reversible so that the packages 25 may be alternatively discharged at various heights on opposite sides of the support structure.

FIG. 9 sets forth the construction of the support structure 120. As can be seen in the drawing, the support structure includes two "A" shaped support frames 122 distanced apart by a base plate 126. A pair of linear actuators 128 extend up the inside of the two "A" shaped support frames 122. The linear actuators 128 may be driven in any manner known in the art, but preferably include a timing belt drive. Alternately, a screw-type linear actuator may be utilized. The linear actuators 28 are supported by vertical plates 130 to prevent warping and for reinforcement. Each of the linear actuators 128 includes a linear actuator carriage 132 configured to travel along the linear actuator's length. An encoder (not shown) monitors the vertical position of the carriage 132 of the linear actuator, and provides a signal to the controller 180. An actuator speed reducer 134 is attached by two drive shafts 136 to simultaneously drive the linear actuators 128, and is driven by a motor 138. The controller 20 sets the speed and direction of the motor 38.

As best shown in FIG. 10, the power conveyor 121 is attached to the linear actuator carriages 132 by two conveyor support plates 140, such that the power conveyor 121 can move up and down the support structure 120 along the linear actuators 128. The power conveyor 121 includes a continuous belt 141 which is driven by a motor 142 and a speed reducer 144, via timing belts 146, 148, in a manner known in the industry. The controller 20 sets the speed and direction of the motor 42.

Each lift conveyor 121 includes a deceleration sensor 150 positioned to sense when the leading edge of a package traveling onto the belt conveyor 121 reaches a predetermined location intermediate the ends of the conveyor 121. The deceleration sensors 150 are best seen in FIG. 2, and are similar to the deceleration sensor 26 of the feed conveyor 20. As described below, if the package cannot immediately be discharged from the conveyor 121, the drive motor 142 connected to the conveyor 121 is stopped as soon as the package reaches the position of the deceleration sensor 150, so that the package come to rest fully on the lift conveyor 121 for any vertical travel that may be necessary.

The set of output chutes 500 is a plurality of chutes 160 whose entrance ends are positioned to receive packages from one of the lift conveyors 121. In FIG. 1, the chutes 160 are numbered 1-18. A group of the output chutes 160 (labeled 1-15 and 18) form a two-dimensional array in a vertical plane adjacent to the vertical path of travel of the lift conveyors 121 of the vertical lifts 110-114. Five of the chutes (labeled 2, 5, 8, 11, and 14) are positioned at the feed level so that packages destined for these output chutes are moved from conveyor cells of the sorter matrix directly into the chutes without vertical movement of the lift conveyors 121. The chutes labeled 16 and 17 are positioned on the opposite side of the vertical lift 114 from the chutes labeled 13 and 15. Discharge into the chutes 16 and 17 requires reverse operation of the lift conveyor 121 of the vertical lift 114. It will be understood that additional output chutes 160 could be provided above and under the matrix sorter 300.

Each output chute includes a chute input sensor assembly 165 positioned at its entrance, for detecting the discharge of a package from an adjacent lift conveyor 121. Alternately, sensor assemblies may be placed at both ends of the lift conveyor 121, rather than in the chutes, to reduce the total number of sensors utilized.

An optional consolidation belt conveyor 170 is shown in FIG. 1, held by legs above the conveyor cells 32 and 33. The conveyor 170 may receive packages from vertical lifts 110 or 111, and transfer such packages to output chute 16. This may be useful if a very large number of packages are known to go to the destination of chute 16. By consolidating their output, two vertical lifts and associated sorting cells can be used for one destination, increasing the throughput of the sorting system 100. An input sensor assembly and a discharge sensor assembly (not shown) may be associated with the conveyor 170.

Operation

Figure 11:
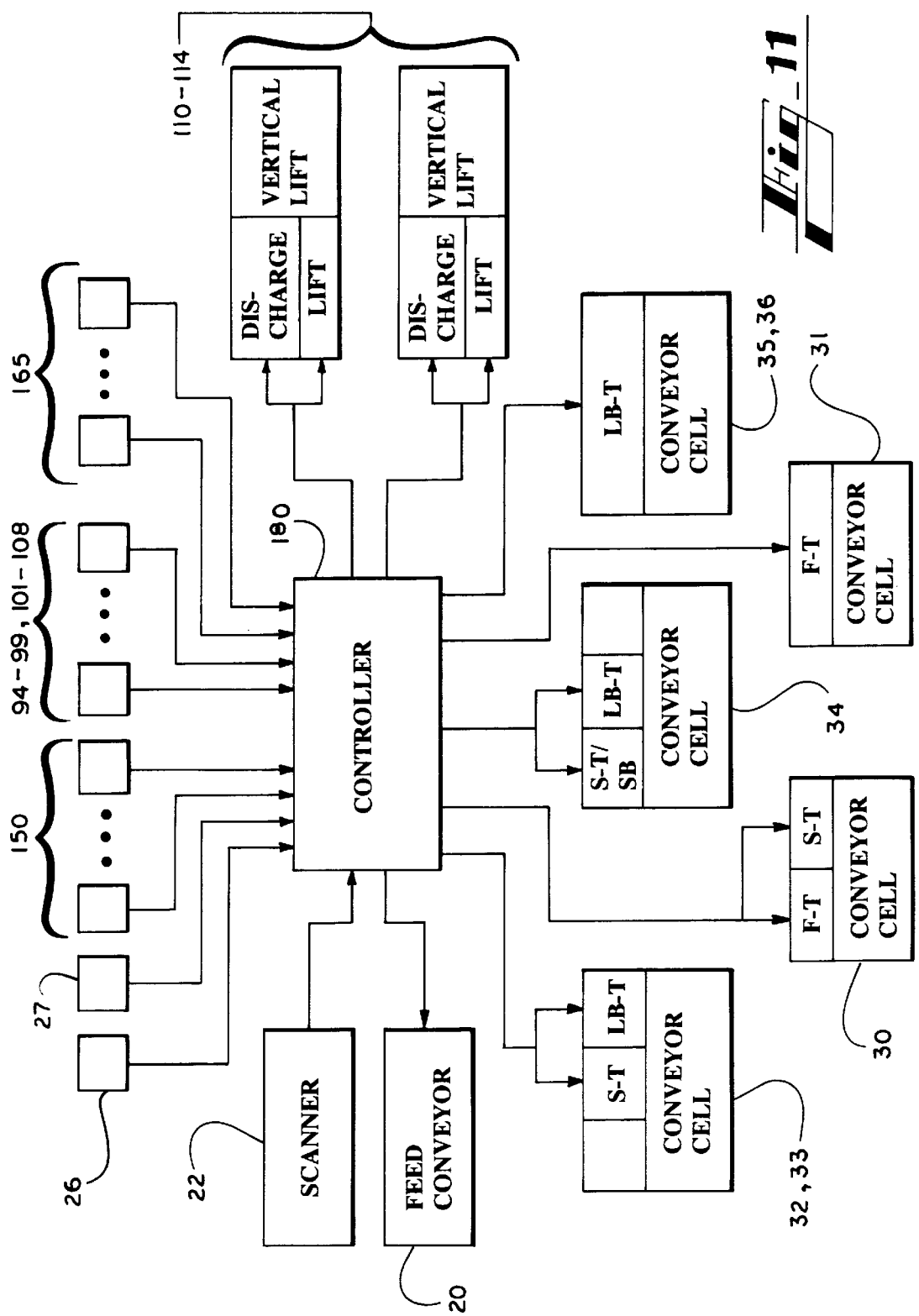
FIG. 11 is a block diagram showing the device input signals to the controller and the control signal outputs therefrom.
Figure 12:
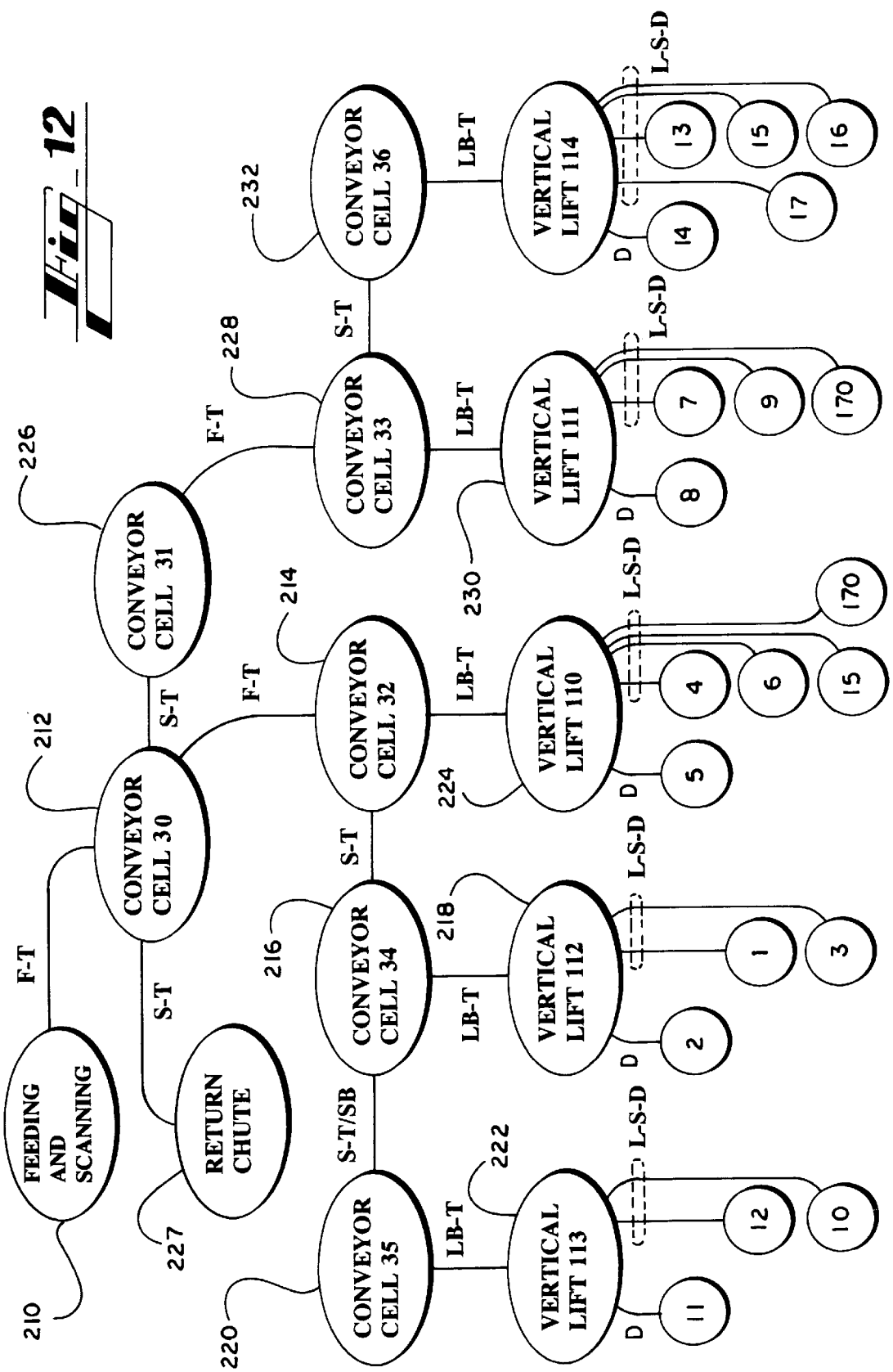
FIG. 12 is a state diagram of the sorting system, noting the logic routines utilized in changing between states as packages are sorted.

Referring now to FIG. 11, the controller 180 coordinates the routing of packages through the sorting system 100. The controller receives information about packages and their location within the system from the scanner 22 and the various position sensor assemblies 26, 27, 94–99, 101–108, 150, and 165. The controller sends control signals to operate the feed conveyor 20, the powered rollers 40 of the various conveyor cells 30–36, the lift conveyors 121, the linear actuators of the vertical lifts 110–114, the stop bars 48 and 52, and the deceleration mode of the feed conveyor and the lift conveyors. FIG. 12 is a state diagram showing the states of a package passing through the system, and noting the logic routines utilized in changing between states as packages are sorted. The shorthand notations used in FIGS. 11 and 12 are as follows:

| F-T | forward transfer | (FIG. 19) |
| S-T | side transfer | (FIG. 20) |
| S-T/SB | side transfer with side stop bar operation | (FIG. 21) |
| LB-T | transfer to lift conveyor belt | (FIG. 22) |
| L-S-D | level shift and discharge | (FIG. 23) |
| D | discharge | (FIG. 22) |

Generally described, a package 25 to be sorted is placed onto the feed conveyor 20 either automatically from an upstream conveyor or chute system, or manually. A stream of single packages may be fed through the sorting system 100. Conventional apparatus for resolving packages on a conveyor into a single file may be utilized upstream from the feed conveyor 20. When the package is in state 210 of FIG. 12, the controller 180 operates the feed conveyor 20 to carry the package 25 beneath the scanner 22, which reads a label on the package and transmits information from the label, such as zip code information encoded in a bar code or MaxiCode symbol, to the controller. The controller assigns a destination bin 160 to the package based on the zip code or other address information read by the scanner, and maps a path through the system from cell to cell, then onto a lift conveyor and to an output chute at the appropriate level. The controller also monitors whether the transfer conveyor cells 30–36 are occupied or empty. If the input cell 30 is occupied, the controller decelerates and stops the feed conveyor 20 when the leading edge of the package reaches the deceleration sensor 26.

When the input cell 30 is empty, the controller operates the feed conveyor to transfer the package in the forward direction onto the input cell 30 (state 212). Preferably, the powered rollers 40 of all the cells 30–36 are operating continuously at the same speed, so that any package being transferred onto a cell is immediately drawn onto the cell by its powered rollers. Also, the forward stop plates 48 and side stop plate 52 are normally in a raised position. Unless the package is to immediately move in another forward transfer to the cell 32, the forward stop bar 48 stops the motion of the package. The controller monitors the signal from the sensor 27 to note the entrance of the package leading edge onto the cell 30 as well as when the trailing edge of the package clears the sensor 27. At this time, the controller memory marks the cell 30 as occupied by the package and its destination.

The controller 180 continually monitors the status of each of the conveyor cells 30–36, and applies logic to dispose of any package that arrives at a cell. First, the logic routines applied to transfer any arriving package to another cell will be described (FIGS. 13–18), and then the subroutines that are called by such logic routines for particular transfer operations (FIGS. 19–22).

Figure 13:
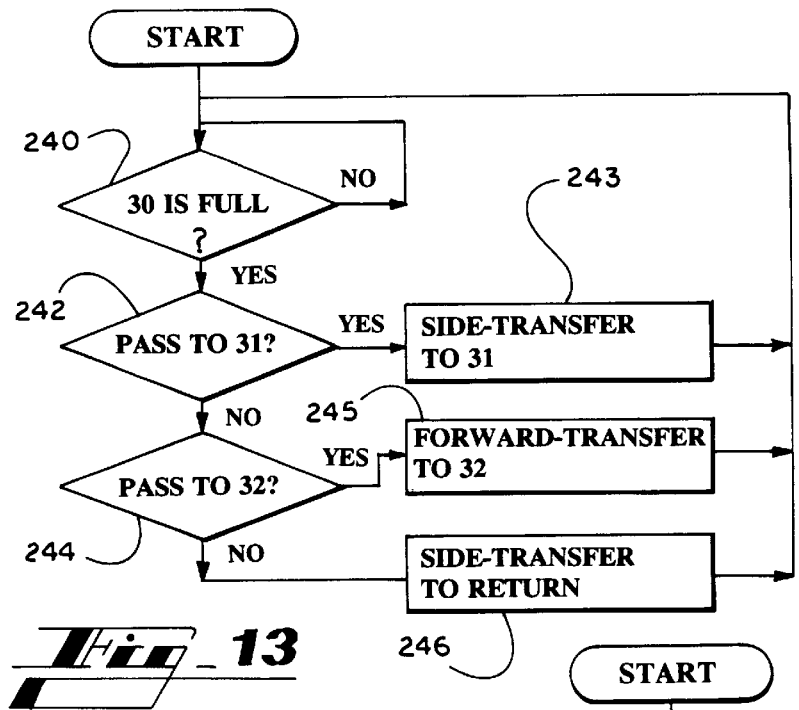
FIG. 13 is a flow diagram of the logic applied in transferring a package from the input conveyor cell.

The logic used by the controller for moving a package from the cell 30 is shown in FIG. 13. At step 240, the controller determines if cell 30 is occupied. If so, the controller determines if the path for the package includes cell 31 at step 242. If so, a side transfer subroutine is executed at step 243, moving the package to cell 31, state 226 in FIG. 12. The side transfer subroutine is described below in connection with FIG. 20. If cell 31 is not in the path, the controller determines if the path includes cell 32 at step 244. If so, at step 245 a forward transfer subroutine is executed, moving the package to state 214. The forward transfer subroutine is described below in connection with FIG. 19. If cell 32 is not in the path, a side transfer subroutine is executed at step 246 to transfer the package to the return chute 99, which is state 227.

Figure 14:
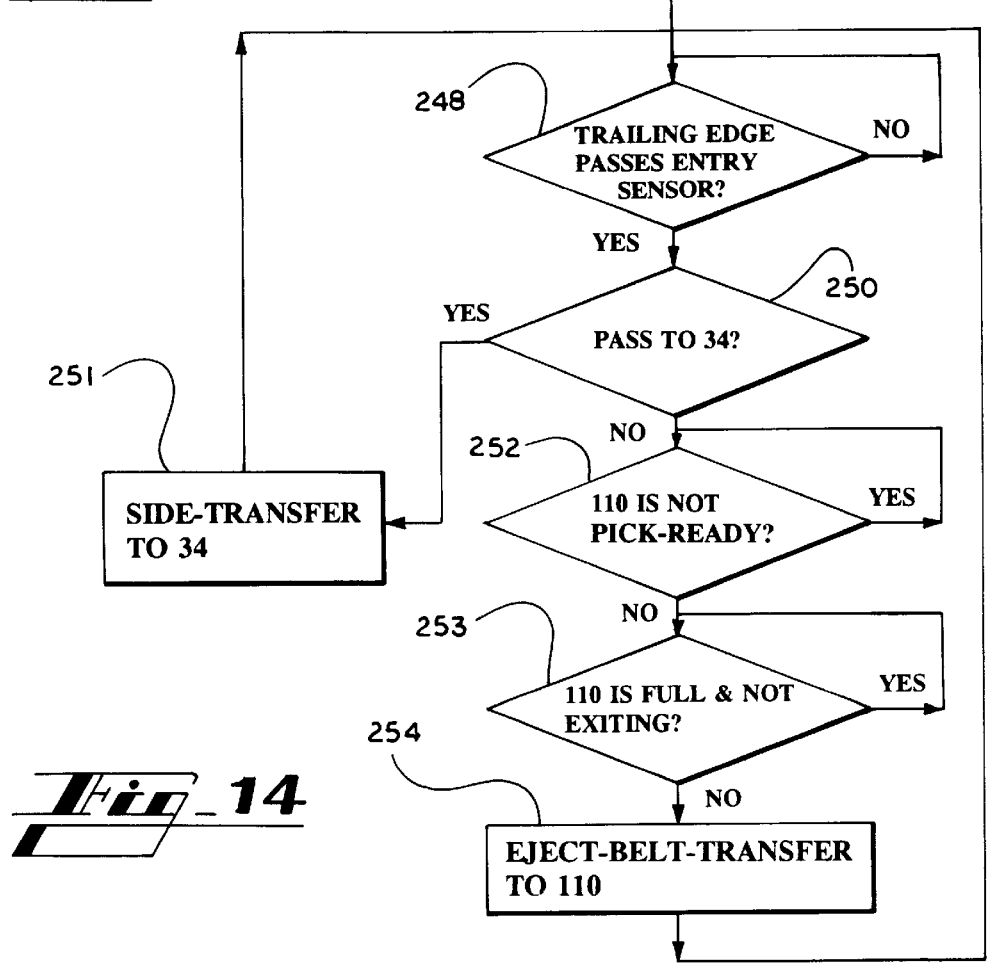
FIG. 14 is a flow diagram of the logic applied in transferring a package from the conveyor cell in the second row adjacent to the input cell.

The logic used by the controller for moving a package from the cell 32 is shown in FIG. 14. At step 248, the controller determines if the trailing edge of the package has cleared the entry sensor 94. When this is true, at step 250 the controller determines if the path includes cell 34. If so, at step 251 the controller executes a side transfer as shown in FIG. 20 to move the package to cell 34 (state 216). If not, at step 252 the controller determines if the lift conveyor belt 121 of the vertical lift 110 is present at feed level. If so, at step 253 the controller determines if the belt 121 is full and not discharging a package. If true, the controller waits until the belt 121 is empty or in the process of discharging a package into the chute 5. Then, at step 254 the controller executes a transfer to lift belt subroutine to move the package to the lift belt 121 (state 224). The transfer to lift belt subroutine is described below in connection with FIG. 22.

Figures 15, 16:
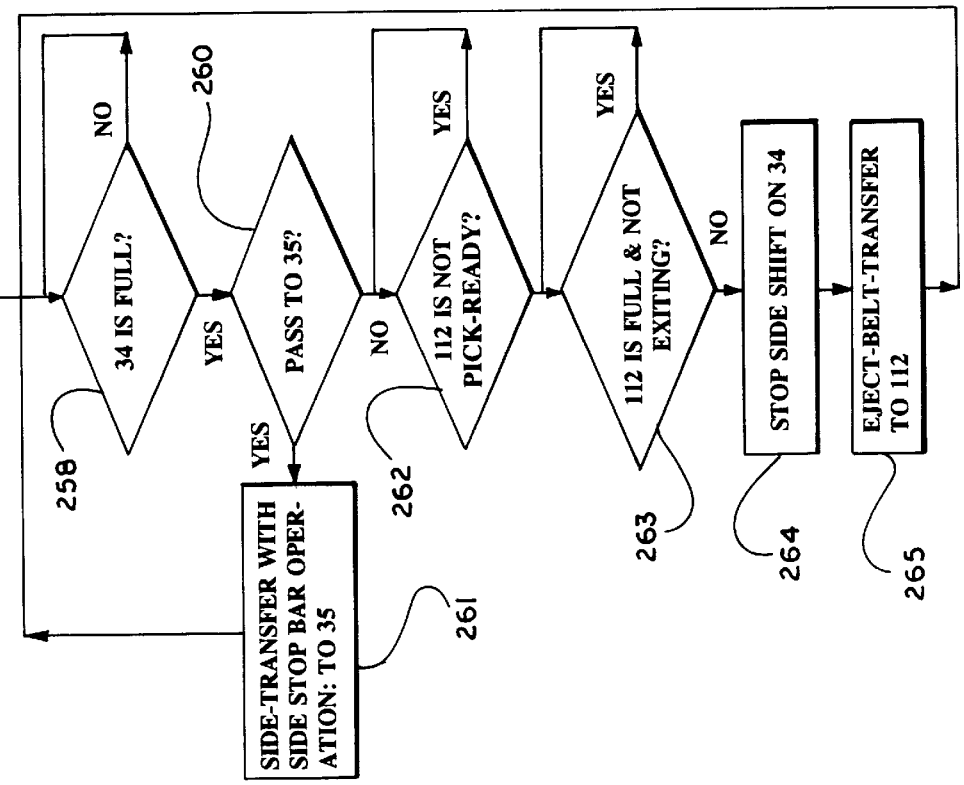
FIG. 15 is a flow diagram of the logic applied in transferring a package from the cell to the right of the cell of FIG. 14.
FIG. 16 is a flow diagram of the logic applied in transferring a package from the cell to the left of the cell of FIG. 14.

The logic used by the controller for moving a package from the cell 34 is shown in FIG. 15. At step 258, the controller determines if cell 34 is occupied. Movement of a package into cell 34 always involves a side transfer from cell 32 by the side transfer belts 42. The package is held against the movable stop plate 52 by the continuing action of the belts 42. If this condition exists, then at step 260 the controller determines if the path includes cell 35. If so, at step 261 the controller executes a side transfer with side stop plate operation to move the package to cell 35 (state 220). The side transfer with side stop plate operation subroutine is described below in connection with FIG. 21. If the path does not include cell 35, at step 262 the controller determines if the lift conveyor belt 121 of the vertical lift 112 is present at feed level. If so, at step 263 the controller determines if the belt 121 is full and not discharging a package. If true, the controller waits until the belt 121 is empty or in the process of discharging a package into the chute 2. Then, at step 264 the controller stops operation of the side transfer belts 42 without dropping the side stop plate 52 executes the transfer to lift belt subroutine to move the package to the lift belt 121 (state 218).

The logic used by the controller for moving a package from the cell 31 consists only of an immediate forward transfer subroutine, moving the package to the cell 33 (state 228).

The logic used by the controller for moving a package from the cell 33 is shown in FIG. 16. The steps are identical to those of FIG. 14, except that at step 270 the first possible path is to the cell 36 (state 232), and the vertical lift referred to in steps 272–274 is lift 111 (state 230).

The logic used by the controller for moving a package from the cell 36 is shown in FIG. 17. At step 276, the controller determines if cell 36 is occupied. As in the case of cell 34, movement of a package into cell 36 always involves a side transfer, here from cell 33, by the side transfer belts 42. The package is held against the movable fixed side plate 87 by the continuing action of the belts 42. If this condition exists, then at step 277 the controller determines if the lift conveyor belt 121 of the vertical lift 114 is present at feed level. If so, at step 278 the controller determines if the belt 121 is full and not discharging a package. If true, the controller waits until the belt 121 is empty or in the process of discharging a package into the chute 14. Then, at step 279 the controller stops operation of the side transfer belts 42 and executes the transfer to lift belt subroutine to move the package to the lift belt 121 (state 234).

The logic used by the controller for moving a package from the cell 35 is shown in FIG. 18. The steps are identical to those of FIG. 17, except that the vertical lift referred to in steps 287–290 is lift 113 (state 222).

Figure 19:
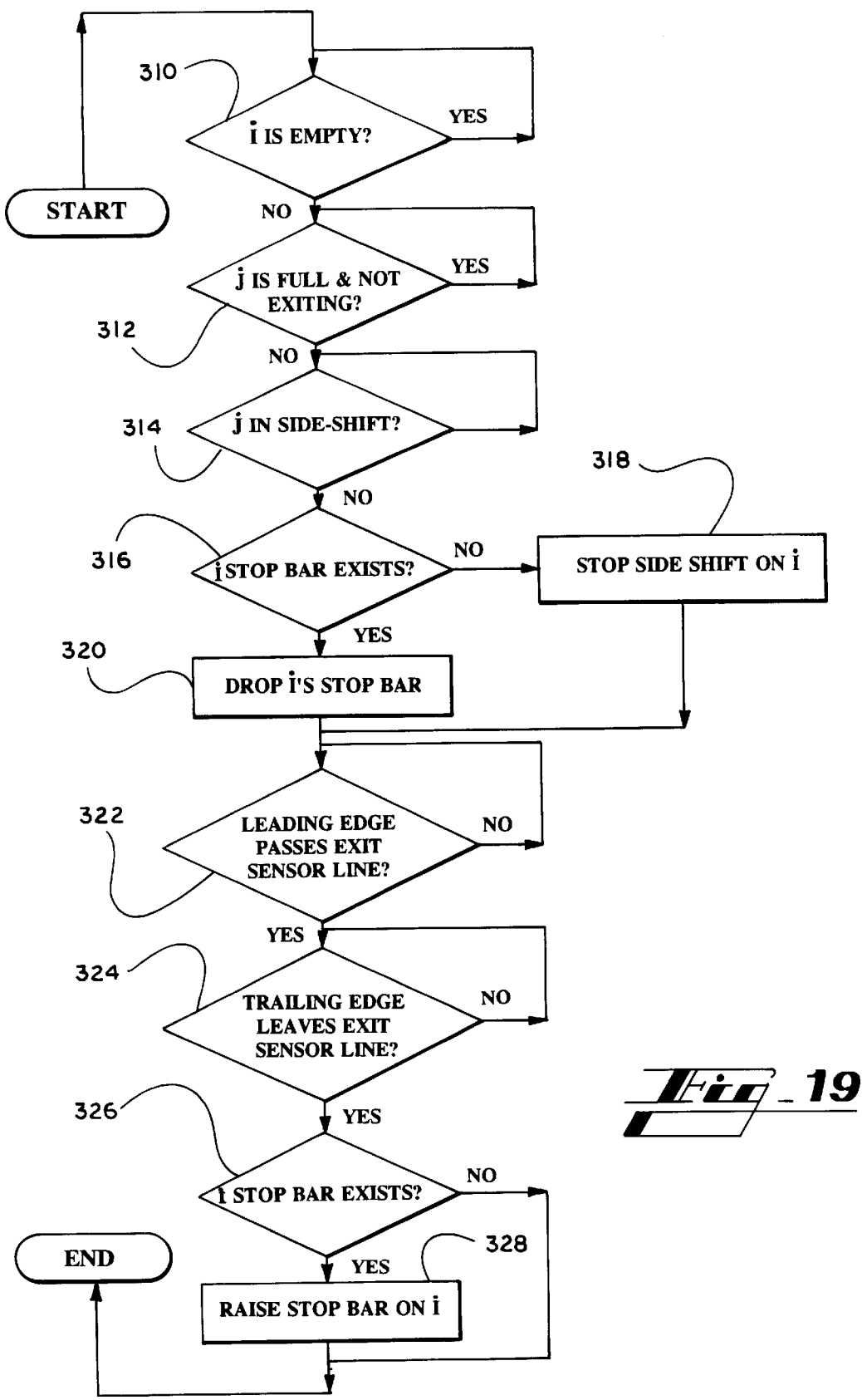
FIG. 19 is a flow diagram of the logic applied in forward transfer of a package to a succeeding row.

The routines of FIGS. 19–23 will be explained in connection with example package paths. As a first example, assume that the package is destined for the vertical lift 112 and one of the output chutes 1, 2, or 3. A forward transfer logic subroutine, as shown in FIG. 19, is run by the controller. Referring to FIG. 19, the routine is shown generically for forward transfer from a cell i to a cell j. At decision step 310, the controller determines if the current cell i (in this case cell 30) is empty. If so, the process waits until a package occupies the current cell. When a package is present and is to be moved forward, at decision step 312, the controller determines if the next cell j in the forward direction (in this case cell 32) is full and not in the process of exiting a package. If so, the controller waits until cell j is either empty or is exiting another package. Then, at decision step 314, the controller checks to see if the exiting is a side transfer, which would not be consistent with a forward transfer onto cell j. If so, the controller waits until cell j is not executing a side transfer. Then, at decision step 316, the controller determines if cell i has a forward stop plate (which is the case for cell 30). If so, the stop plate is lowered at step 320, which immediately allows the running rollers 40 to advance the package onto the running rollers of cell j. At steps 322 and 324, the exit sensor of cell i (here sensor 97) confirms to the controller that the package has cleared cell i. When this is confirmed and i's stop bar exists (step 326), the stop plate 48 is again raised at step 328. At this point, the package has been transferred to cell 32 (state 214 in FIG. 12) and rests against the forward stop plate of cell 32.

The next step in the path of the example package to vertical lift 113 is a side transfer to cell 34, according to the logic subroutine of FIG. 20. Again, the routine is shown generically for side transfer from cell i to cell j. It applies only when there is no side stop plate between cells i and j. At decision step 340, the controller determines if the current cell i (in this case cell 32) is empty. If so, the process waits until a package occupies the current cell. When a package is present and is to be moved to the side, at decision step 342, the controller determines if the next cell j in the side direction (in this case cell 34) is empty. If, not, the controller waits until cell j is empty. Then, at step 344, side transfer is initiated by raising the side transfer belts 42 of both cells i and j, and operating them to carry the package in the direction of cell j. At step 346, the entry sensor for cell j (here sensor 102) sends a signal to the controller when the trailing edge of the package clears the sensor, and thus is clear of the cell i. Then at step 348, the side transfer action is stopped, and the side transfer belts 42 are lowered.

It should be noted that all cells of the sorting system 300 that are capable of receiving a side transfer have either fixed or movable side stop plates to hold the package on the cell until it either continues sideways movement (possible in the case of movement from cell 34 to cell 35), or is lowered onto the powered rollers 40 for forward transfer. In the case of the present example, the package is stopped by the elevated stop bar 52. When the side transfer belts 42 of the cell 34 are lowered, the powered rollers of the cell 34 immediately begin to transfer the package in the forward direction, and the controller executes steps 416 through 426 of a transfer to lift belt logic subroutine shown in FIG. 22. At step 416, the controller activates the belt drive motor 142 of the lift conveyor belt 121 of vertical lift 112 to operate the belt in the forward direction. When the leading edge of the package triggers the exit sensor 107 of the cell 34, as monitored by decision step 418, the controller determines at step 420 if the package must stop on the belt 121 for a level shift. If so, when the leading edge triggers the deceleration sensor 150 at step 422, the controller stops the motor 142 at step 424. Also, the controller prevents any further action until the trailing edge of the package clears the sensor 107, monitored at step 426. At this point, the package is in state 218 as shown in FIG. 12.

If, at step 420, it is determined that the package is to be directly discharged into the chute 2, the process proceeds directly to step 426 without stopping the belt 121. The controller is informed when package has cleared the exit sensor 107 of cell 34, and the package moves immediately into the chute 2.

If, on the other hand, the package has stopped in state 218 for a level shift, a level shift and discharge logic subroutine shown in FIG. 23 is executed. At step 430, the controller determines if the package is on the belt 121, and the belt is stopped. When this is true, at step 432, the controller operates the lift motor 138 to drive the belt 121 to the desired output chute level, either up to chute 1 or down to chute 3. When the encoder signal associated with the carriage 132 of the linear actuator indicates the belt 121 is coming close to the destination level, as monitored at step 434, the controller at step 436 begins to drive the belt 121, in this case in the forward direction, so that the package is moving when the chute level is reached, and the package immediately exits the belt 121 into the chute. At step 438, the controller determines when the trailing edge of the package clears the chute sensor 165, and then drives the linear actuator at step 439 to return the belt 121 to the feed level. When the encoder output indicates the belt 121 is approaching the feed level, at step 440, the controller decelerates the belt 121 to a stop at the feed level, and waits for another package to be loaded.

This completes the sorting of the first example package. Considering a different example, assume the package was destined for the vertical lift 113. In this case, the package must continue transversely from cell 34 to cell 35, according to a logic subroutine shown in FIG. 21. At the end of the side transfer subroutine of FIG. 20, operation of the side transfer belts 42 of the cell 34 is not terminated if the path mapped for the package continues to cell 35. At step 350, the controller determines if a package is present on a current cell i (here cell 34) that is equipped with a movable side stop plate assembly 50. If so, the controller determines if the next cell j (here cell 35) is empty and the lift conveyor 121 of the vertical lift 113 is empty at the feed level. When this is true, the stop plate 52 is dropped and side transfer by the belts 42 of both cells is operated at step 354 until the trailing edge of the package passes the side transfer sensor 101 as monitored at step 356. The package comes to rest against the fixed side stop 86. The package is now in state 220 in FIG. 12. Then, at step 358, operation of the side transfer belts is stopped and the belt 121 drive is started. The package drops onto the powered rollers of the cell 35 and is carried onto the belt 121 of the vertical lift 113, state 222 in FIG. 12. The belt 121 is controlled according to steps 416 to 426 of FIG. 22, as described above. Movement of the lift to a proper output level, if necessary, is executed in accordance with FIG. 23, as described above.

Figure 22:
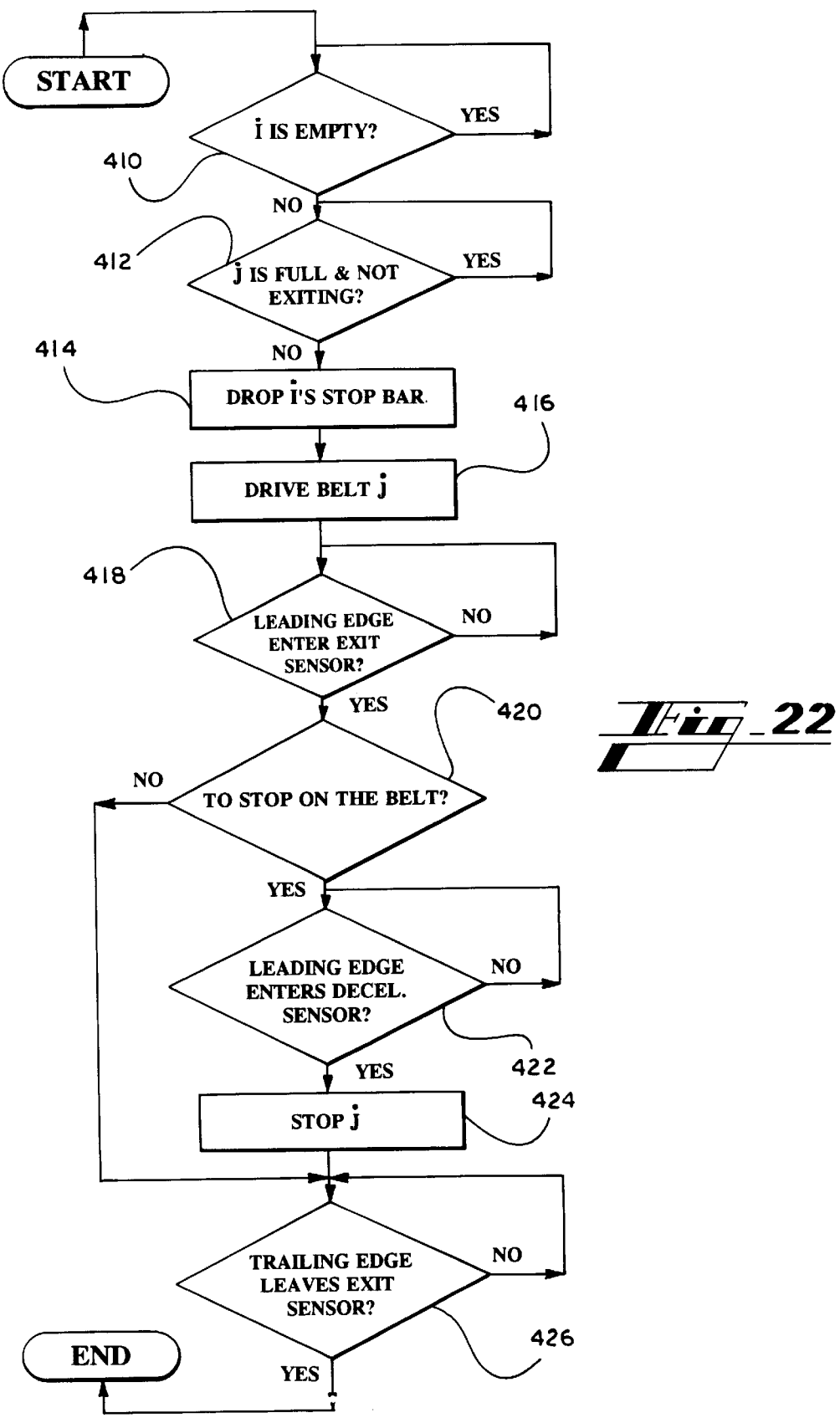
FIG. 22 is a flow diagram of the logic applied in transfer of a package from a conveyor cell to a lift conveyor.

Considering still another example, assume the package is destined for vertical lift 110 and one of the output chutes 4, 5, 6, or 18. Progress of the package to state 214 is as described above. Then a transfer subroutine in accordance with FIG. 22 is executed beginning with step 410, at which the controller determines if the current cell 32 is empty. When the controller determines that the cell 32 is occupied, then at step 412 the controller determines if the lift conveyor 121 of the vertical lift 110 is full and not discharging a package into the chute 5. If so, the controller waits until the lift conveyor 121 is ready. Then, at step 414, the forward stop plate 48 of the cell 32 is dropped, allowing the powered rollers 40 to begin to move the package forward. At the same time, the lift conveyor belt 121 is operated in the forward direction at step 416. From this point, the routine of FIG. 22 continues as described above, moving the package to state 224.

It will be understood that transfers within the matrix not specifically described above, such as involving cells 31, 33, and 36, are carried out in a manner similar to the examples described above. If the destination output chute is chute 16 or 17, when the lift conveyor reaches the chute level, it is operated by the controller in reverse direction at step 436 of the level shift and discharge subroutine of FIG. 23.

From the foregoing, it will be understood that the sorter matrix 300 functions as a package buffer and sorter before the package is fed forward onto the lift conveyors. Multiple packages can be found at different locations within the matrix buffer at the same time. The buffer regulates the package horizontal transfer based upon its destination. A package is moved within the matrix and onto the lift conveyors only if its next position is clear. Position sensors are used to provide status information about the current conveyor on which the package is located, and about other conveyors farther along the planned path of the package, so that conveyor operation can be optimized to move packages through the matrix rapidly. No movement of the cells of the matrix from place to place occurs; only the lift conveyors 121 move, and they only move vertically.

While this invention has been described in detail with particular reference to a preferred embodiment thereof, it will be understood that modifications and variations may be made without departing from the spirit and scope of the invention as defined in the appended claims.

What is claimed is:

1. A system for sorting a stream of objects emanating one-by-one from an object source, comprising:
   a matrix of stationary conveyor cells, said matrix including a plurality of said cells positioned to form at least two transversely extending rows of adjacent conveyor cells and at least two longitudinally extending rows of adjacent conveyor cells,
   an input cell of said conveyor cells in a first transversely extending row and also in a first longitudinally extending row being positioned to receive objects from said object source and configured to transfer said objects to an adjacent cell within said first transversely extending row or alternately to transfer said objects to an adjacent cell within said first longitudinally extending row,
   an output cell of said conveyor cells in a second transversely extending row and also in a second longitudinally extending row and configured to receive said objects from an adjacent cell within said second transversely extending row or alternately to receive said objects from an adjacent cell within said second longitudinally extending row;
   a controller connected to operate a plurality of said conveyor cells in said matrix individually to discharge an object thereon in one of a plurality of directions;
   a plurality of destination locations positioned adjacent to said conveyor cells in at least one of said transverse rows other than said first transverse row; and
   a reader positioned adjacent to said stream of objects to read destination information borne by said objects,
   said controller being operative responsive to said reader to guide each object received by said input cell from cell to cell through said matrix to said output cell and then a destination location corresponding to said destination information.

2. The system of claim 1, wherein said controller is operative to plan a path for each of said objects from said input cell to a destination location, to monitor availability of successive conveyor cells along said path, and to cause an object to be moved to the next conveyor cell along its path only when said next conveyor cell is available.

3. The system of claim 2, further comprising a plurality of sensors positioned to sense the passage of objects from one conveyor cell to another, said sensors being connected to said controller.

4. The system of claim 3, further comprising a stop selectively positionable to prevent passage of an object from one conveyor cell to a next conveyor cell, said controller causing said stop to be removed when said next cell is available.

5. The system of claim 1, wherein at least one of said destination locations comprises an output conveyor.

6. The system of claim 1, wherein at least one of said destination locations comprises an output conveyor positioned to deliver said objects to a chute.

7. The system of claim 1, wherein at least one of said destination locations comprises an elevator operative to deliver said objects to a receiving location positioned at a level outside the plane of said matrix of conveyor cells.

8. The system of claim 1, wherein a plurality of said destination locations comprise elevators operative to deliver said objects to a plurality of receiving locations positioned in columns of said receiving locations.

9. The system in claim 8, wherein said elevators are operative to discharge objects in a plurality of directions, and wherein said receiving locations are positioned to receive objects from said elevators in a plurality of said discharge directions.

10. The system of claim 1, wherein said conveyor cells comprise a plurality of powered rollers aligned to move objects longitudinally, and a plurality of side transfer belts mounted to be raised between said powered rollers and operated to move objects transversely.

11. A system for accepting a stream of objects emanating one-by-one from an object source and delivering same to one or more destination locations, said system comprising:
   a matrix of stationary conveyor cells, said matrix including a plurality of said cells positioned to form at least two transversely extending rows of adjacent conveyor cells and at least two longitudinally extending rows of adjacent conveyor cells,
   an input cell of said conveyor cells in a first transversely extending row and also in a first longitudinally extending row being positioned to receive objects from said object source and configured to transfer said objects to an adjacent cell within said first transversely extending row or alternately to transfer said objects to an adjacent cell within said first longitudinally extending row, an output cell of said conveyor cells in a second transversely extending row and also in a second longitudinally extending row and configured to receive said objects from an adjacent cell within said second transversely extending row or alternately to receive said objects from an adjacent cell within said second longitudinally extending row;

a controller connected to operate a plurality of said conveyor cells in said matrix individually to discharge an object thereon in one of a plurality of directions;

a reader positioned adjacent to said stream of objects to read destination information borne by said objects, said controller being operative responsive to said reader to guide each object received by said input cell from cell to cell through said matrix to said output cell and then to one or more destination locations corresponding to said destination information.

12. A method of sorting a stream of objects emanating one-by-one from an object source, and delivering same to one or more destination locations, said method comprising the steps of:

providing a matrix of stationary conveyor cells, said matrix including a plurality of said cells positioned to form at least two transversely extending rows of adjacent conveyor cells and at least two longitudinally extending rows of adjacent conveyor cells;

providing an input cell within said matrix in a first transversely extending row and in a first longitudinally extending row being positioned to receive objects from said object source and configured to transfer said objects to an adjacent cell within said first transversely extending row or alternately to transfer said objects to an adjacent cell within said first longitudinally extending row;

providing an output cell within said matrix in a second transversely extending row and in a second longitudinally extending row and configured to receive said objects from an adjacent cell within said second transversely extending row or alternately to receive said objects from an adjacent cell within said second longitudinally extending row;

transferring a first object from said object source to said input cell;

transferring said first object from said input cell to a cell adjacent to said input cell and within said first transverse row;

transferring said first object from said first transverse row to said output cell;

transferring said first object from said output cell to a destination location;

transferring a second object from said object source to said input cell;

transferring said second object from said input cell to a cell adjacent to said input cell and within said first longitudinal row;

transferring said second object from said first longitudinal row to said output cell; and transferring said second object from said output cell to a destination location.

13. The method of claim 12, further comprising the steps of:

reading destination information from each of said objects as the objects enter said matrix; and guiding said objects to one of said destination locations corresponding to said destination information.

14. The method of claim 12, further comprising, as said objects exit said matrix, the step of:

moving at least some of said objects vertically to receiving locations outside the plane of said matrix.

15. The method of claim 12, further comprising the steps of:

monitoring availability of a next conveyor cell in said matrix to which an object is to be moved; and moving said object to said next cell only when said next cell is available.

16. The method of claim 15, further comprising selectively erecting a stop prior to said next cell until said next cell is available.

* * * * *